US011026050B2

(12) United States Patent
Kuber et al.

(10) Patent No.: US 11,026,050 B2
(45) Date of Patent: Jun. 1, 2021

(54) SELF-HEALING IN A LUMINAIRE OR OTHER RADIO FREQUENCY POSITIONING NODE BASED SYSTEM

(71) Applicant: ABL IP HOLDING LLC, Conyers, GA (US)

(72) Inventors: Pranav Kuber, Somerville, MA (US); Jesse Grant, Needham, MA (US); Emanuel Paul Malandrakis, Boston, MA (US); Sajin George, Somerville, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 236 days.

(21) Appl. No.: 16/382,548

(22) Filed: Apr. 12, 2019

(65) Prior Publication Data
US 2020/0329341 A1    Oct. 15, 2020

(51) Int. Cl.
*H04W 4/02* (2018.01)
*H04W 4/33* (2018.01)
(Continued)

(52) U.S. Cl.
CPC .......... *H04W 4/025* (2013.01); *H04B 17/318* (2015.01); *H04L 67/10* (2013.01);
(Continued)

(58) Field of Classification Search
CPC ....... H04W 4/025; H04W 4/33; H04W 84/18; H04W 84/12; H05B 47/19; H04B 17/318;
(Continued)

(56) References Cited

U.S. PATENT DOCUMENTS

| 8,928,232 B2 * | 1/2015 | Aggarwal | H05B 47/11 |
| | | | 315/153 |
| 2018/0027598 A1 * | 1/2018 | Roquemore, III | H04W 76/10 |
| | | | 370/254 |

OTHER PUBLICATIONS

Wikipedia, "Assignment problem," downloaded at https://en.wikipedia.org/wiki/Assignment_problem, last edited on Mar. 18, 2019, 5 pages.

(Continued)

*Primary Examiner* — Jaime M Holliday
(74) *Attorney, Agent, or Firm* — RatnerPrestia

(57) ABSTRACT

An example luminaire-based positioning system calculates a respective distance between an uncommissioned luminaire to each of neighboring commissioned luminaires based on a respective received signal strength indicator (RSSI) measurement. Based on the calculated respective distance to each of the neighboring commissioned luminaires and a set of commissioned location coordinates of each of the neighboring commissioned luminaires, luminaire-based positioning system estimates a set of uncommissioned location coordinates of the uncommissioned luminaire. The luminaire-based positioning system determines a best fit assignment of the set of uncommissioned location coordinates of uncommissioned luminaires in an uncommissioned luminaire list to the set of commissioned location coordinates of non-operational commissioned luminaires in a non-operational luminaire list. The luminaire-based positioning system adjusts a luminaire node map for each of the non-operational commissioned luminaires based on the determined best fit assignment.

20 Claims, 12 Drawing Sheets

(51) Int. Cl.
   *H04B 17/318* (2015.01)
   *H04L 29/08* (2006.01)
   *H05B 47/19* (2020.01)
   *H04W 84/18* (2009.01)
   *H04W 84/12* (2009.01)
   *H04B 17/27* (2015.01)

(52) U.S. Cl.
   CPC .............. *H04W 4/33* (2018.02); *H05B 47/19* (2020.01); *H04B 17/27* (2015.01); *H04L 67/04* (2013.01); *H04L 67/18* (2013.01); *H04L 67/28* (2013.01); *H04W 84/12* (2013.01); *H04W 84/18* (2013.01)

(58) Field of Classification Search
   CPC ......... H04B 17/27; H04L 67/10; H04L 67/28; H04L 67/18; H04L 67/04
   See application file for complete search history.

(56) References Cited

OTHER PUBLICATIONS

Wikipedia, "DBSCAN," downloaded at https://en.wikipedia.org/wiki/DBSCAN, last edited on Mar. 28, 2019, 6 pages.

\* cited by examiner

*FIG. 1C*

Luminaire Node Map 125

| Commissioned Luminaire Position | Commissioned Luminaire Identifier Settings 126A-W | Set of Commissioned Location Coordinates 127A-W | |
|---|---|---|---|
| | | X Location Coordinate | Y Location Coordinate |
| 1 | 110A | 1 | 1 |
| 2 | 110B | 2 | 1 |
| 3 | 110C | 3 | 1 |
| 4 | 110D | 4 | 1 |
| 5 | 110E | 5 | 1 |
| 6 | 110F | 1 | 2 |
| 7 | 110G | 2 | 2 |
| 8 | 110H | 3 | 2 |
| 9 | 110I | 4 | 2 |
| 10 | 110J | 5 | 2 |
| 11 | 110K | 1 | 3 |
| 12 | 110L | 2 | 3 |
| 13 | 110M | 3 | 3 |
| 14 | 110N | 4 | 3 |
| 15 | 110O | 5 | 4 |
| 16 | 110P | 1 | 4 |
| 17 | 110Q | 2 | 4 |
| 18 | 110R | 3 | 4 |
| 19 | 110S | 4 | 4 |
| 20 | 110T | 5 | 4 |
| 21 | 110U | 6 | 1 |
| 22 | 110V | 6 | 2 |
| 23 | 110W | 6 | 4 |

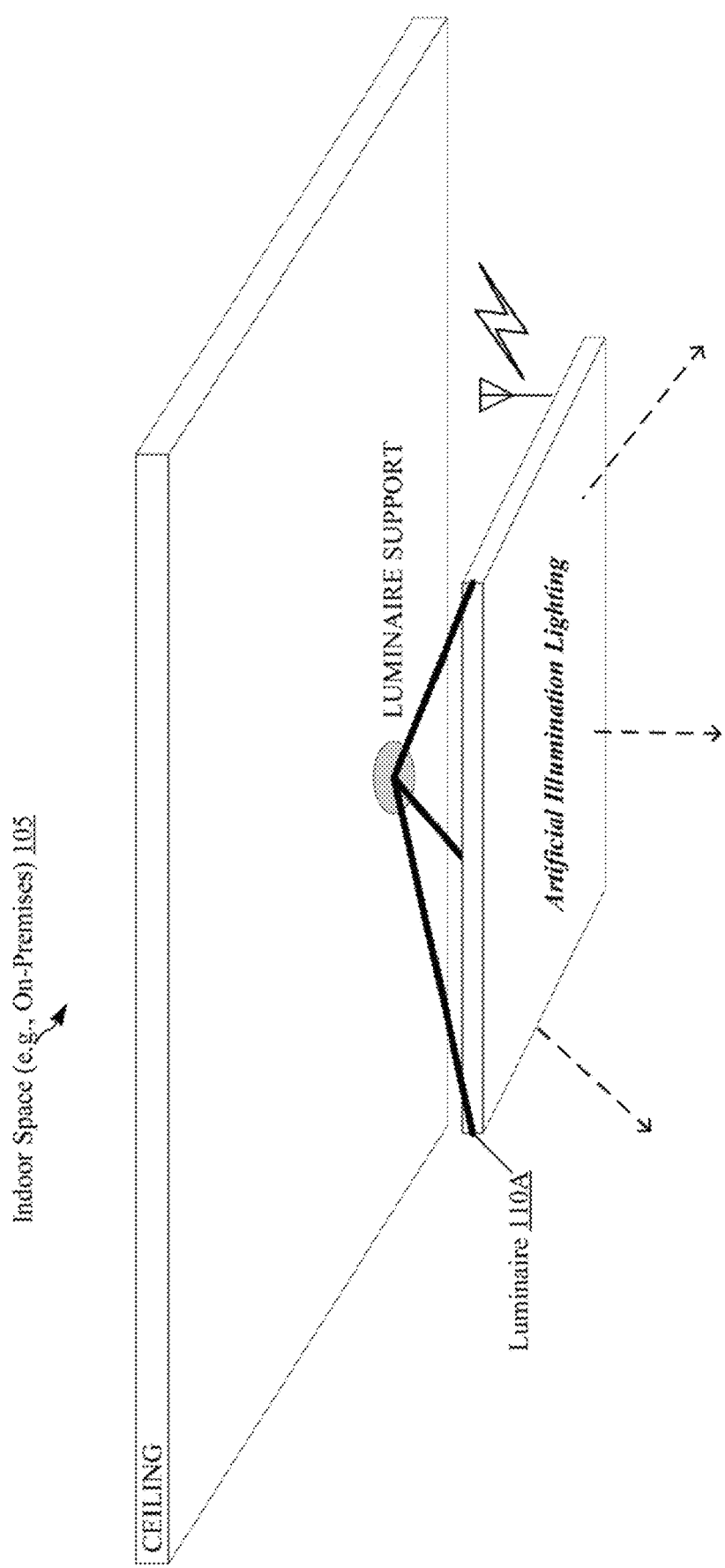

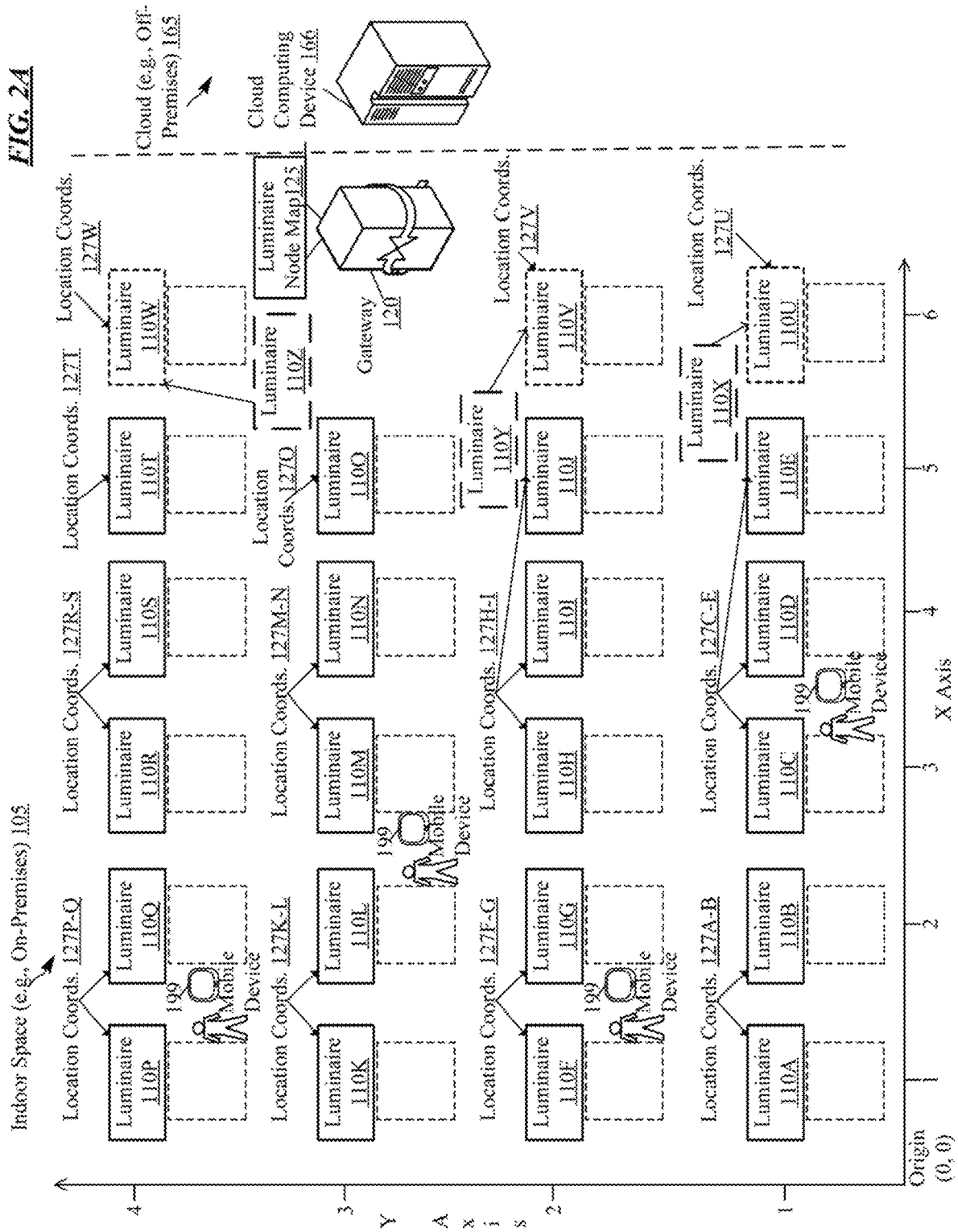

*FIG. 2B*

Adjusted Luminaire Node Map 225

| Commissioned Luminaire Position | Commissioned Luminaire Identifier Settings 126A-W | Set of Commissioned Location Coordinates 127A-W ||
|---|---|---|---|
| | | X Location Coordinate | Y Location Coordinate |
| 1 | 110A | 1 | 1 |
| 2 | 110B | 2 | 1 |
| 3 | 110C | 3 | 1 |
| 4 | 110D | 4 | 1 |
| 5 | 110E | 5 | 1 |
| 6 | 110F | 1 | 2 |
| 7 | 110G | 2 | 2 |
| 8 | 110H | 3 | 2 |
| 9 | 110I | 4 | 2 |
| 10 | 110J | 5 | 2 |
| 11 | 110K | 1 | 3 |
| 12 | 110L | 2 | 3 |
| 13 | 110M | 3 | 3 |
| 14 | 110N | 4 | 3 |
| 15 | 110O | 5 | 4 |
| 16 | 110P | 1 | 4 |
| 17 | 110Q | 2 | 4 |
| 18 | 110R | 3 | 4 |
| 19 | 110S | 4 | 4 |
| 20 | 110T | 5 | 4 |
| 21 | ~~110U~~110X | 6 | 1 |
| 22 | ~~110V~~110Y | 6 | 2 |
| 23 | ~~110W~~110Z | 6 | 4 |

SELF-HEALING IN A LUMINAIRE OR OTHER RADIO FREQUENCY POSITIONING NODE BASED SYSTEM

BACKGROUND

In an luminaire-based (e.g., indoor or outdoor) positioning system having commissioned luminaires networked through some wireless communications technology, e.g., Bluetooth Low Energy (BLE), typically it is necessary to know the physical locations of the luminaires. Without this knowledge, proximity of a mobile device (e.g., a smartphone) cannot be translated into an estimate of a physical location of the mobile device.

Therefore, such a luminaire-based positioning system typically includes a luminaire node map, which is a table of known physical location coordinates associated with each of the luminaires. For example, if the mobile device measures the relative strengths of signals from three nearby commissioned neighbors (e.g., luminaires) of known physical location coordinates and known broadcast power, those signal strengths may be used to estimate the mobile device's position relative to the luminaires.

The commissioned luminaires, including embedded wireless communication and processing components, sometimes become non-operational (e.g., non-responsive, fail, break, or defective). When this occurs, a technician manually identifies the non-operational commissioned luminaires, for example, by commanding all luminaires in the indoor space to dim and seeing which luminaires fail to obey the command. The replacement luminaires are then commissioned by hand, e.g., by using a mobile device running a commissioning application to identify individual uncommissioned luminaires, calling up the luminaire node map of the indoor space, and entering the new luminaire identifier in the luminaire node map. This replacement luminaire commissioning process is labor-intensive, therefore slow and expensive. Typically, qualified technicians must travel to locations of the indoor space needing commissioning of replacement luminaires and carry out manual commissioning of the replacement luminaires.

SUMMARY

In an example, a method includes sending from a gateway, via a local wireless communication network or a secondary network, a health status request message to each commissioned luminaire requesting a health status response message. The method further includes in response to sending the health status request message to each commissioned luminaire: receiving, via the local wireless communication network or the secondary network, from operational commissioned luminaires the health status response message indicating a commissioned luminaire identifier. The method further includes in response to sending the health status request message to each commissioned luminaire: failing to receive from non-operational commissioned luminaires the health status response message indicating the commissioned luminaire identifier. The method further includes in response to sending the health status request message to each commissioned luminaire: storing the commissioned luminaire identifier of each of the non-operational commissioned luminaires in a non-operational commissioned luminaire list. The method further includes receiving, via the local wireless communication network or the secondary network, a respective uncommissioned luminaire identifier from a plurality of uncommissioned luminaires. The method further includes storing the respective uncommissioned luminaire identifier of the uncommissioned luminaires in an uncommissioned luminaire list.

The method further includes sending, via the local wireless communication network or the secondary network, a scan request message to each uncommissioned luminaire requesting a scan response message. The method further includes receiving, via the local wireless communication network or the secondary network, from each of the uncommissioned luminaires the scan response message including: (i) the respective uncommissioned luminaire identifier, (ii) a neighboring commissioned luminaire list of commissioned luminaire identifiers of neighboring commissioned luminaires, and (iii) a respective received signal strength indicator (RSSI) measurement of the uncommissioned luminaire to each of the neighboring commissioned luminaires.

An example luminaire-based positioning system includes a plurality of luminaires located in an indoor space, each respective one of the luminaires including: a light source, a driver circuit coupled to the light source to control light source operation, a luminaire local wireless network communication interface configured for wireless communication over a local wireless communication network. Each respective one of the luminaires further includes a luminaire memory and a luminaire processor coupled to the driver circuit, the luminaire local network communication interface, and the luminaire memory. The luminaire-based positioning system further includes a gateway including a gateway network communication interface system including a gateway local wireless network communication interface configured for wireless communication over the local wireless communication network. The gateway further includes a gateway memory including a luminaire node map of commissioned luminaires in the indoor space. The luminaire node map includes multiple commissioned luminaire identifier settings, including a respective commissioned luminaire identifier setting of each commissioned luminaire in the indoor space. The luminaire node map further includes multiple sets of commissioned location coordinates, each set of commissioned location coordinates stored in association with the respective commissioned luminaire identifier setting. The gateway further includes a gateway processor coupled to the gateway network communication interface system and the gateway memory. The gateway further includes gateway self-healing programming in the gateway memory.

Execution of the gateway self-healing programming by the gateway processor configures the gateway to implement functions, including functions to send, via the gateway local wireless network communication interface, a health status request message to each commissioned luminaire requesting a health status response message. Execution of the gateway self-healing programming by the gateway processor configures the gateway to implement functions to in response to sending the health status request message to each commissioned luminaire: receive from operational commissioned luminaires the health status response message indicating a commissioned luminaire identifier. Execution of the gateway self-healing programming by the gateway processor configures the gateway to implement functions to further in response to sending the health status request message to each commissioned luminaire: fail to receive from non-operational commissioned luminaires the health status response message indicating the commissioned luminaire identifier.

Execution of the gateway self-healing programming by the gateway processor configures the gateway to implement functions to further in response to sending the health status request message to each commissioned luminaire: store the commissioned luminaire identifier of each of the non-operational commissioned luminaires in a non-operational commissioned luminaire list. Execution of the gateway self-healing programming by the gateway processor configures the gateway to implement functions to receive, via the gateway local wireless network communication interface, a respective uncommissioned luminaire identifier from a plurality of uncommissioned luminaires in the indoor space. Execution of the gateway self-healing programming by the gateway processor configures the gateway to implement functions to store the respective uncommissioned luminaire identifier of the uncommissioned luminaires in an uncommissioned luminaire list.

Execution of the gateway self-healing programming by the gateway processor configures the gateway to implement functions to send, via the gateway local wireless network communication interface, a scan request message to each uncommissioned luminaire requesting a scan response message. Execution of the gateway self-healing programming by the gateway processor configures the gateway to implement functions to in response to sending the scan request message to each uncommissioned luminaire, receive from each of the uncommissioned luminaires the scan response message including: (i) the respective uncommissioned luminaire identifier, (ii) a neighboring commissioned luminaire list of commissioned luminaire identifiers of neighboring commissioned luminaires, and (iii) a respective received signal strength indicator (RSSI) measurement of the uncommissioned luminaire to each of the neighboring commissioned luminaires.

Another example method includes generating a non-operational commissioned luminaire list including a respective commissioned luminaire identifier of a plurality of non-operational commissioned luminaires. The method further includes receiving, via a local wireless communication network or a secondary network, from each of a plurality of uncommissioned luminaires: (i) a respective uncommissioned luminaire identifier, (ii) a neighboring commissioned luminaire list of commissioned luminaire identifiers of neighboring commissioned luminaires, and (iii) a respective signal strength indicator measurement of the uncommissioned luminaire to each of the neighboring commissioned luminaires. The method further includes for each of the uncommissioned luminaires in the uncommissioned luminaire list, estimating a set of uncommissioned location coordinates of the uncommissioned luminaire.

Yet another example method includes generating a non-operational commissioned radio frequency (RF) positioning node list including a respective commissioned RF positioning node identifier of a plurality of non-operational commissioned RF positioning nodes. The method further includes receiving, via a local wireless communication network or a secondary network, from each of a plurality of uncommissioned RF positioning nodes: (i) a respective uncommissioned RF positioning node identifier, (ii) a neighboring commissioned RF positioning node list of commissioned RF positioning node identifiers of neighboring commissioned RF positioning nodes, and (iii) a respective signal strength indicator measurement of the uncommissioned RF positioning node to each of the neighboring commissioned RF positioning nodes. The method further includes for each of the uncommissioned RF positioning nodes in the uncommissioned RF positioning node list, estimating a set of uncommissioned location coordinates of the uncommissioned RF positioning node.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1C is the luminaire node map of the luminaire-based positioning system of FIGS. 1A-B depicted in a table format.

FIG. 1D is an isometric view of a luminaire mounted in the indoor space.

FIG. 2A is a schematic of the luminaire-based positioning system of FIG. 1A similar to FIG. 1B showing that twenty of the initially commissioned luminaires are operational commissioned luminaires, but three of the initially commissioned luminaires have become non-operational commissioned luminaires.

FIG. 2B is an adjusted luminaire node map generated in response to detecting the three non-operational commissioned luminaires to self-heal the luminaire node map.

DETAILED DESCRIPTION

Figure 1A:
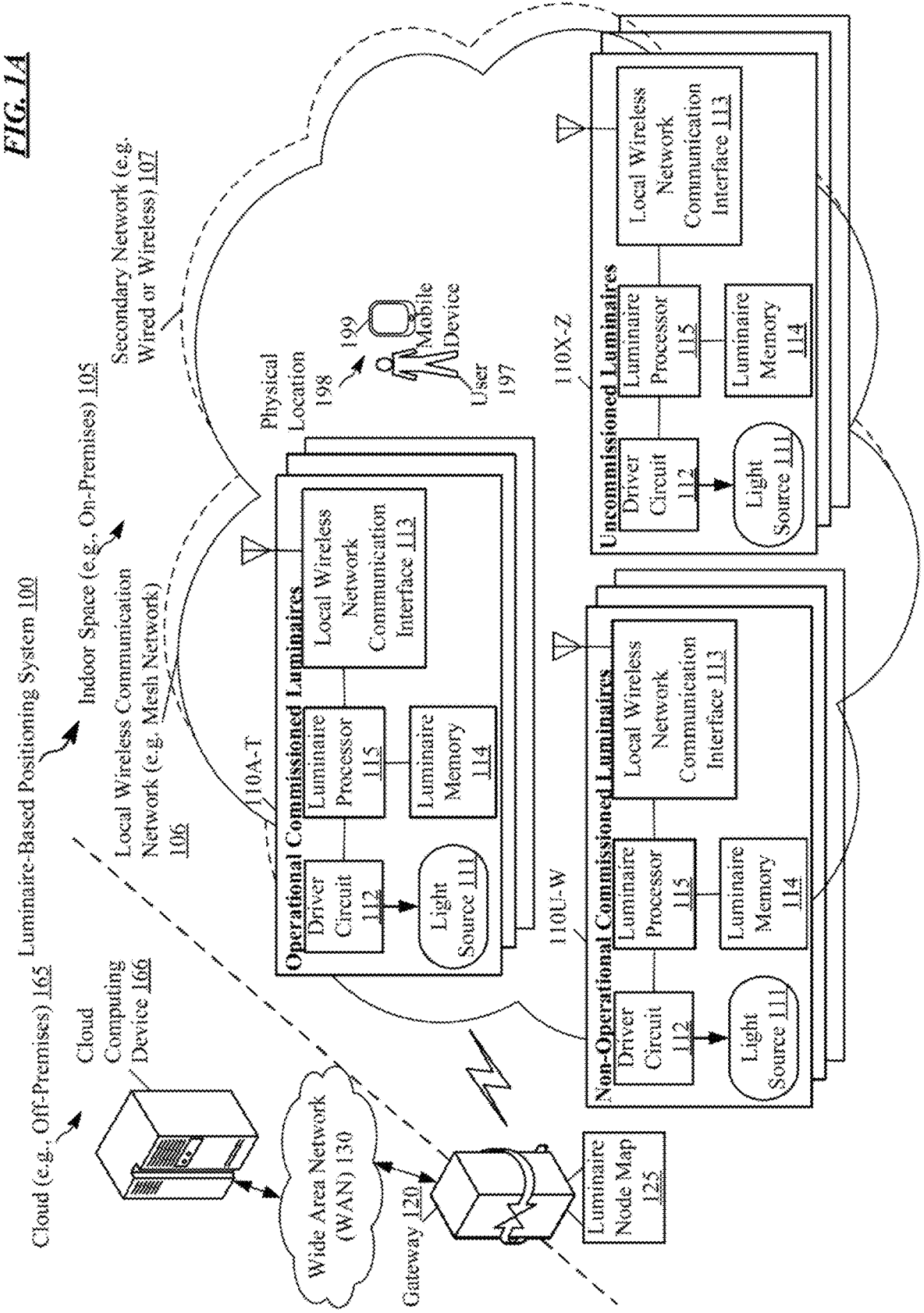
FIG. 1A is a high-level functional block diagram of an example of a luminaire-based positioning system of networks and devices that support self-healing of a luminaire node map of an indoor space and provide a variety of communications in support of determining a physical location of a mobile device of a user in the indoor space.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the luminaires are just one example of a radio frequency (RF) positioning node, which includes additional components; however, the self-healing can be applied to various other types of RF positioning nodes. Generally, the RF positioning node includes a minimum subset of components of the luminaire 110A-Z shown in FIG. 5, such as the local wireless network communication interfaces 113A-B (or other wired or wireless communication interfaces), memory 114 (including the depicted self-healing programming 116 and data), processor 115, and power supply 505. However, the RF positioning node does not have to include the light source 111, driver circuit 112, drive/sense circuitry 535, and detector(s) 565 components. A wireless beacon is an example of an RF positioning node that is a chip with a radio that emits a signal with a certain signal strength, small packets of information, and has an RF positioning node identifier. RF positioning nodes can be connected together via wired and/or wireless networks.

The examples in the drawings and described below relate to self-healing an RF positioning node map (e.g., a luminaire node map) of a previously commissioned RF positioning node (e.g., luminaire-based positioning) system. During commissioning, a virtual map of a physical installation of RF positioning nodes (e.g., luminaires) within an indoor space of a room, building, etc. or an outdoor space (e.g., streetlights) is created. The devices and techniques described herein automatically update the commissioned RF positioning node (e.g., luminaire) position records associated with respective sets of location coordinates in the RF positioning node map (e.g., luminaire node map) of the previously commissioned RF positioning node (e.g., luminaire-based positioning) system. The devices and techniques identify where non-operational commissioned RF positioning nodes (e.g., luminaires) and replacement uncommissioned RF positioning nodes (e.g., luminaires) are located within the indoor space or the outdoor space, and then automatically commission the uncommissioned RF positioning nodes (e.g., luminaires) to replace the non-operational commissioned RF positioning nodes (e.g., luminaires). The devices and techniques also cut down on manual installation time as well as require less effort and knowledge on the part of installers of the RF positioning node (e.g., luminaire-based) positioning system.

In an example, when a single commissioned RF positioning node (e.g., luminaire) becomes non-operational, a technician replaces the non-operational commissioned RF positioning node (e.g., luminaire). A back-end computing device wirelessly polls for uncommissioned RF positioning nodes (e.g., luminaires) in the network, and replaces the old RF positioning node identifier (e.g., luminaire identifier) of the non-operational commissioned RF positioning node (e.g., luminaire) in the RF positioning node map (e.g., luminaire node map) with a new RF positioning node identifier (e.g., luminaire identifier) of a single replacement RF positioning node (e.g., luminaire). In another example, when N>1 replacement RF positioning nodes (e.g., luminaires) become non-operational, upon polling, the back-end computing device observes many new RF positioning node (e.g., luminaire) identifiers from multiple replacement RF positioning nodes (e.g., luminaires). The back-end computing device then determines which of the multiple replacement RF positioning nodes (e.g., luminaires) correspond to which various physical location coordinates of the non-operational commissioned RF positioning nodes (e.g., luminaires) in an automated protocol.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "luminaire-based positioning system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below. FIG. 1A is a high-level functional block diagram of an example of a luminaire-based positioning system 100 of networks and devices that support self-healing of a luminaire node map 125 of an indoor space (e.g., on premises) 105 and provide a variety of communications in support of determining a physical location 198 of a mobile device 199 of a user 197 in the indoor space 105. Although the example luminaire-based positioning system 100 is described for the indoor space 105, the luminaire-based positioning system 100 can be deployed in an outdoor space (e.g., using streetlights). As shown, luminaire-based positioning system 100 includes a plurality of luminaires 110A-Z located in the indoor space 105, such as a grocery store.

Each respective one of the luminaires 110A-Z includes a light source 111 and a driver circuit 112 coupled to the light source 111 to control a light source operation. The light source 111 may be virtually any type of light source suitable to providing the intended type of light output that may be electronically controlled. The light source 111, for example, may provide visible light output as providing visible illumination for human occupancy or the like and/or visible light source based positioning. The light source 111 may be of the same general type in all of the luminaires 110A-Z, e.g. all formed by some number of light emitting diodes (LEDs); although in many installations, some numbers of the luminaires 110A-Z may have different types of light sources 111, e.g. some use LEDs, some use compact or tube type fluorescent sources, etc. Thus, the light source 111 can include one or more organic light emitting diodes (OLEDs); one or more micro LEDs; one or more nanorod or nanowire LEDs; at least one fluorescent lamp; or at least one halogen lamp.

In the examples herein, the luminaires 110A-Z include at least one or more components forming a light source 111 for generating the artificial illumination light for a general lighting application as well as a local wireless network communication interface 113. In several illustrated examples, such luminaires 110A-Z may take the form of a light fixture, such as a pendant or drop light or a downlight, or wall wash light or the like. For example, luminaires 110A-Z include a pendant down light suspended/hanging from the ceiling, a 2×4 feet light fixture flush mounted on the ceiling, or sconces hung on the wall. Other fixture mounting arrangements are possible. For example, at least some implementations of the luminaire may be surface mounted on or recess mounted in a wall, ceiling or floor. Orientation of the luminaires 110A-Z and components thereof are shown in the drawings and described below by way of non-limiting examples only. The luminaires 110A-Z may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the luminaires 110A-Z further includes a luminaire local wireless network communication interface 113 configured for wireless communication over a local wireless communication network 106. In the example, the local wireless communication network 106 can be a wireless mesh network (e.g., ZigBee, DECT, NFC, etc.), a personal area network (e.g., Bluetooth or Z-Wave), a visual light communication (VLC) network, or Wi-Fi. A VLC network is a data communications variant which uses visible light between 400 and 800 THz (780-375 nm), and is a subset of optical wireless communications technologies. Each respective one of the luminaires 110A-Z further includes a luminaire memory 114 and a luminaire processor 115 coupled to the driver circuit 112, the luminaire local wireless network communication interface 113, and the luminaire memory 114. As further shown in FIG. 5, the luminaire local wireless network communication interface 113 may include separate radios that operate at two different frequencies, such as a first wireless transceiver 113B at sub-GHz (e.g., 900 MHz), and a second wireless transceiver 113A at Bluetooth Low Energy (BLE 2.4 GHz). In some examples, the luminaire local wireless network communication interface 113 can operate at 5 GHz.

It should also be understood that the communication protocols over the local wireless communication network 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 110A-Z. The WAN 130 is a separate network but with a shared application protocol for self-healing. It should be appreciated, however, that local wireless communication network 106 and WAN 130 in a different implementation may be a different part of the same network tree or star network, and therefore may not be separate networks and can utilize the same network communication protocols. In some examples, the luminaire-based positioning system 100 can further include a secondary network 107 (e.g., wired or wireless), such as a backhaul network for communication between the luminaires 110A-Z and the gateway 120.

Luminaire-based positioning system 100 further includes a gateway 120. The gateway 120 is a device that provides access between a wide area network (WAN) 130 and the local wireless communication network 106. The WAN 130 (e.g., Internet) can be a cellular network, optical fiber, cable network, or satellite network that can be connected to via Ethernet, for example. The gateway 120 may provide routing, access, and other services for the luminaires 110A-Z residing at the indoor space 105, for example.

Figure 3:
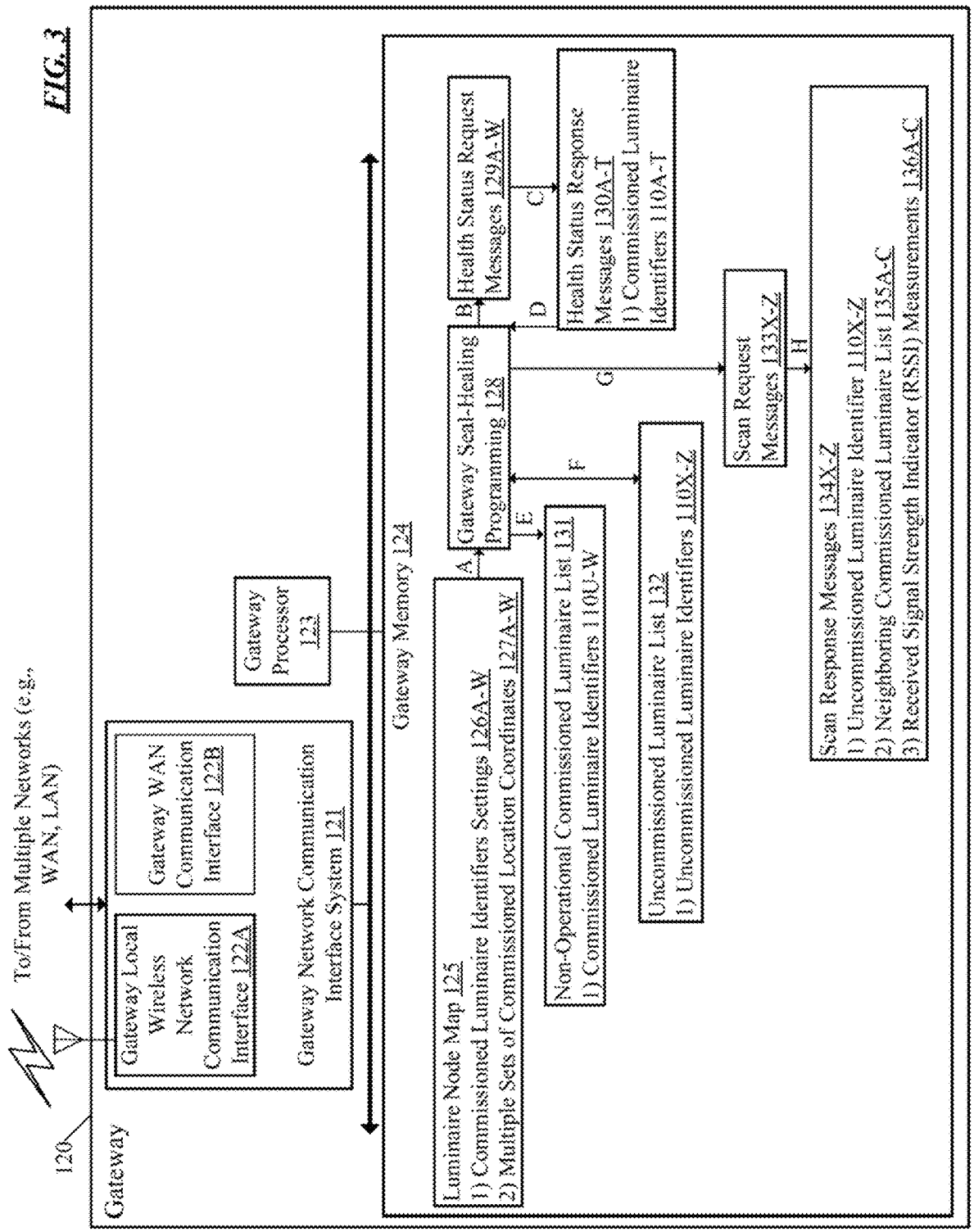
FIG. 3 is a block diagram of a gateway that communicates via the luminaire-based positioning system of FIGS. 1A-B and 2A.

As shown in FIG. 3, the gateway 120 includes a gateway network communication interface system 121 including a gateway local wireless network communication interface 122A configured for wireless communication over the local wireless communication network 106. The gateway network communication interface system 121 further includes a gateway WAN communication interface 122B for communication over the WAN 130. The gateway 120 further includes a gateway memory 124 including a luminaire node map 125 of commissioned luminaires in the indoor space 105. The gateway 120 further includes a gateway processor 123 coupled to the gateway network communication interface system 121 and the gateway memory 124. The gateway 120 further includes gateway self-healing programming 128 in the gateway memory 124.

Figure 4:
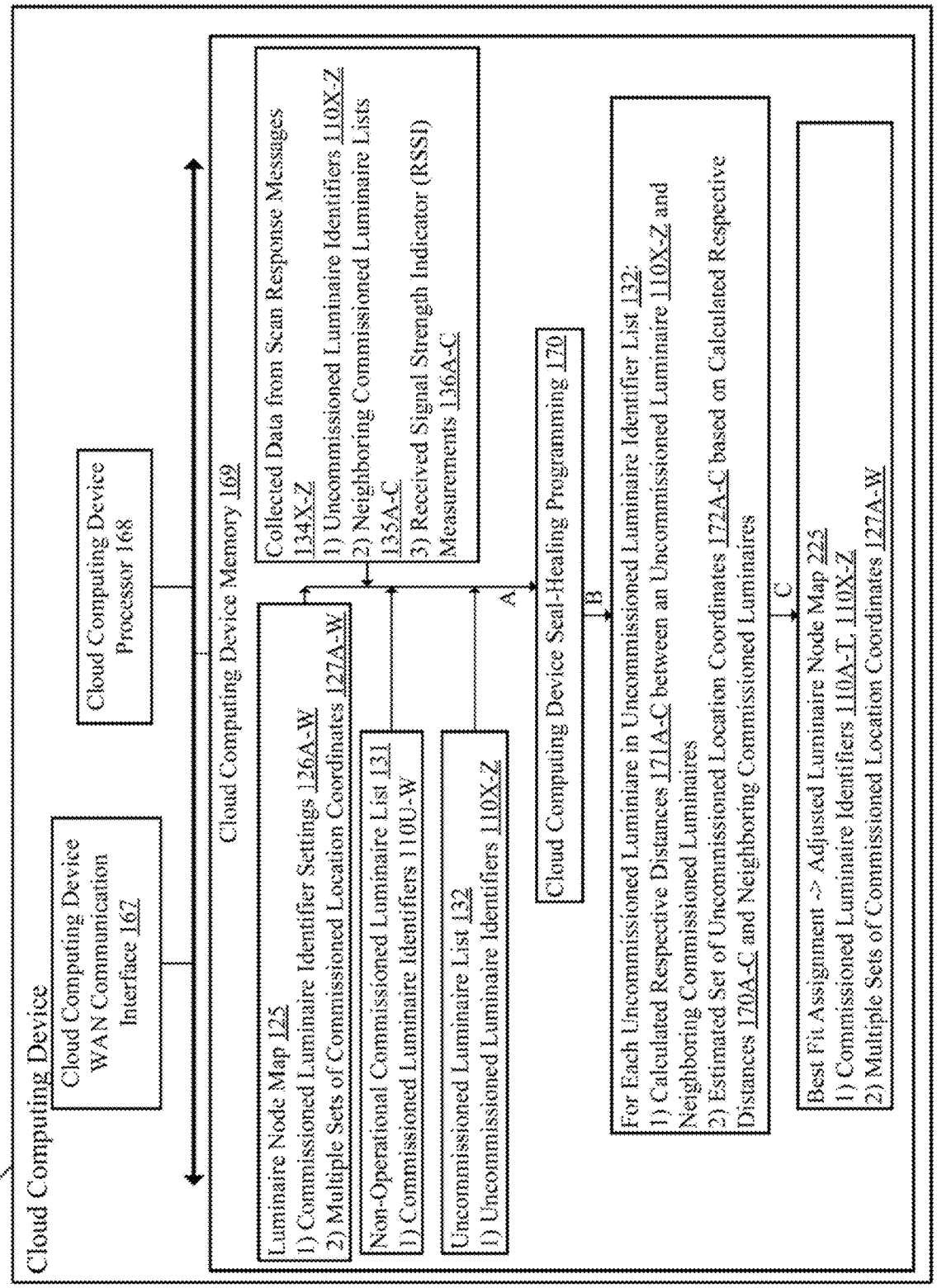
FIG. 4 is a block diagram of a cloud computing device that communicates via the luminaire-based positioning system of FIGS. 1A-B and 2A.

Luminaire-based positioning system 100 further includes a cloud computing device 166, and the cloud computing device 166 resides off-premises in the cloud 165 meaning the cloud computing device 166 is a remote server hosted on the Internet to store, manage, and process data, rather than the local gateway 120. As shown in FIG. 4, the cloud computing device 166 includes a cloud computing device wide area network (WAN) communication interface configured 167 for communication over a WAN 130. The cloud computing device 166 further includes a cloud computing device memory 169 and a cloud computing device processor 168 coupled to the cloud computing device WAN communication interface 167 and the cloud computing device memory 169. The cloud computing device 166 further includes cloud computing device self-healing programming 170 in the cloud computing device memory 169.

Gateway 120 is in communication with a cloud computing device 166 via the WAN 130 to self-heal the luminaire node map 125. In some examples, the gateway 120 is a conduit that sends collected data to the cloud computing device 166, which actually self-heals the luminaire node map 125. However, in another example, the cloud computing device 166 is not needed and the gateway 120 itself may self-heal the luminaire node map 125.

Figure 1B:
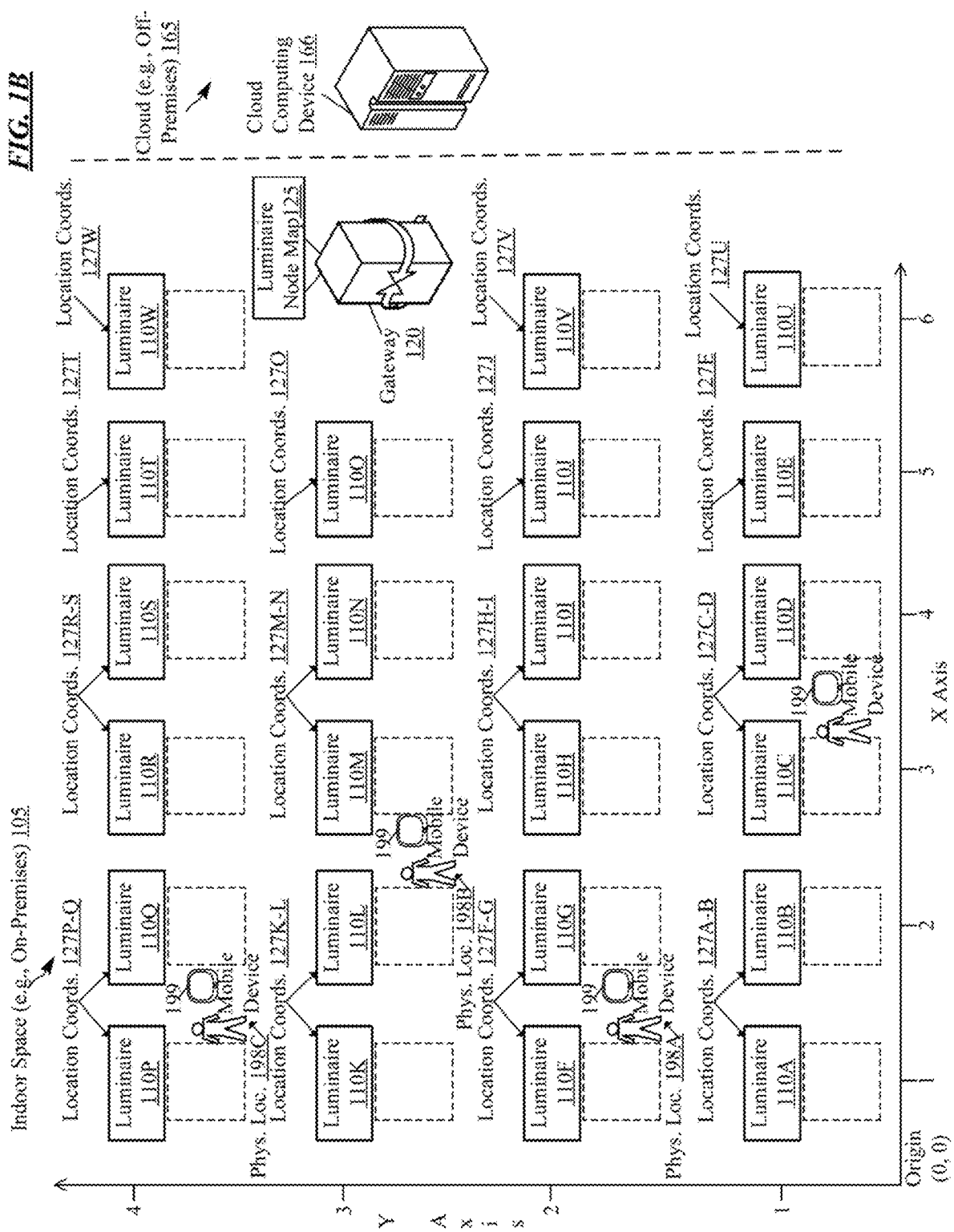
FIG. 1B is a schematic of the luminaire-based positioning system of FIG. 1A that includes a visual layout of twenty-three initially commissioned luminaires as represented by a respective set of location coordinates.

FIG. 1B is a schematic of the luminaire-based positioning system of FIG. 1A that includes a visual layout of twenty-three initially commissioned luminaires 110A-W as represented by a respective set of location coordinates 127A-W. As shown, the respective set of location coordinates 127A-W are located on a two-dimensional Cartesian coordinate system, which includes an X axis for horizontal (e.g., lateral) coordinate position and a Y axis for a vertical coordinate position (e.g., longitudinal). In the example of FIG. 1B, all of the twenty-three initially commissioned luminaires 110A-W are in an operational state. An X location coordinate component of the respective set of location coordinates 127A-W ranges from 1 to 6 in the example, and the Y location coordinate component of the respective set of location coordinates 127A-W ranges from 1 to 4. The X location coordinate and the Y location coordinate cover the entire floor area of the indoor space 105, but do not identify the height of the luminaire 110A-Z (e.g., a Z axis component).

Mobile device 199 of the user 197 (e.g., a human or a robot) can be a smartphone, tablet computer, wearables (e.g., hearing aid, Google Glass, smart watch, or implantables), or laptop/personal computer. In the example of FIGS. 1A-B, luminaires 110A-W communicate with the mobile device 199 of the user and the gateway 120 to determine a physical location 198 of the user 197 in the indoor space 105. Generally, the luminaire-based positioning system 100 determines an initial position in the indoor space 105, shown as physical location 198, of the mobile device 199 based on several received signal strength indicator (RSSI) data communication measurements (e.g., Bluetooth or WiFi) to three or more commissioned luminaires 110A-W. The farther the mobile device 199 is from the commissioned luminaires 110A-W, the lower the respective RSSI data communication measurement becomes. Since the set of commissioned location coordinates 127A-W of the commissioned luminaires 110A-W are all known, the RSSI measurements are the triangulated and/or trilaterated to calculate the physical location 197A of the mobile device 199 of the user within the indoor space 105. As shown in the specific example of FIG. 1B, the user travels through the indoor space 105 carrying the mobile device 199 to three different physical locations 198A-C. As the physical location 198A-C of the mobile device 199 changes, different commissioned luminaires 110A-W are used to take the RSSI measurements. The known sets of commissioned location coordinates 127A-W of those commissioned luminaires 110A-W and RSSI measurements are then used to calculate the physical location 198A-C of the mobile device 199 using triangulation and/or trilateration. This is one is just one possible use of a commissioned set of luminaires as the RF positioning nodes. The commissioned luminaires could be streetlights in an outdoor space, which are dimmed on or off. In some examples, the RF positioning nodes are BLE wireless beacons or other wireless RF devices. For example, this self-healing technique could be used with wireless beacons that are not luminaires. As another alternative, the self-healing technique can be used with luminaires, but not in a positioning system, and instead where the physical location coordinates of the luminaires is needed to set up zones for dimming of a lighting system.

For the physical location 198A, the RSSI measurements taken are between the mobile device 199 and commissioned luminaires 110A, 110B, 110F, and 110G and the physical location 197A is triangulated and/or trilaterated to the sets of commissioned location coordinates 127A, 127B, 127F, and 127G. For the physical location 198B, the RSSI measurements taken are between the mobile device 199 and commissioned luminaires 110G, 110H, 110L, and 110M and the physical location 197B is triangulated and/or trilaterated to the sets of commissioned location coordinates 127G, 127H, 127L, and 127M. For the physical location 198C, the RSSI measurements taken are between the mobile device 199 and commissioned luminaires 110K, 110L, 110P, and 110Q and the physical location 197C is triangulated and/or trilaterated to the sets of commissioned location coordinates 127K, 127L, 127P, and 127Q.

Because the gateway 120 has the luminaire node map 125, the calculation of the physical location 198A-C of the mobile device 199 is implemented on gateway 120. Thus, the mobile device 199 is in communication with the gateway 120 via the local wireless communication network 106. However, in some examples, if the commissioned luminaires 110A-W include the luminaire node map 125, then the calculation of the physical location 198A-C of the mobile device 199 can be implemented in the luminaires 110A-W.

In yet another example, the mobile device 199 itself implements the calculation of the physical location 198A-C. For example, the mobile device 199 includes the luminaire node map 125 and the luminaire-based positioning application 650 (see FIG. 6) loaded in memory 640A-B. The luminaire-based positioning application 650 of mobile device 199 is executed by the CPU 630 to calculate the physical location 198A-C of the mobile device 199. In a final example, the mobile device 199 may be in communication with the cloud computing device 166 via the gateway 120, and the cloud computing device 166 calculates the physical location 198A-C of the mobile device 199, which is sent back to the mobile device 199 via the gateway 120 over the local wireless communication network 106.

Although the RSSI measurements are based on radio frequency (RF) waves, in some examples different ranges in the electromagnetic spectrum can be used for positioning of the mobile device 199. Thus alternatively, visible light modulation of the light source 111 of the luminaires 110A-Z, for example, as disclosed in U.S. Pat. No. 9,287,976; titled "Independent Beacon Based Light Position System," issued Mar. 15, 2016 can be used for positioning the mobile device 199. The calculation of the physical location 198A-C in the indoor space 105 using VLC light waves is similar to RF waves—triangulation and/or trilateration of the RSSI measurements between the mobile device 199 to three or more commissioned luminaires 110A-W whose sets of commissioned location coordinates 127A-W are known is used. For example, the light source 111 may be coupled to a light modulator for visible light communication (VLC). VLC technologies for indoor positioning in the indoor space 105 to determine the position of a mobile device 199 carried by a user 197 are available from Qualcomm Inc. under the trade name Lumicast™. VLC can be done by having luminaires 110A-Z output oscillating light (e.g., projection of a bar-code) in combination with the illumination space lighting.

FIG. 1C is the luminaire node map 125 of the luminaire-based positioning system 100 of FIGS. 1A-B depicted in a table format. Each of the twenty-three initially commissioned luminaires 110A-W is assigned a commissioned luminaire position 1-23 in the luminaire node map 125 ranging from one to twenty-three. The twenty-three positions cover the entire area of the indoor space 105 for which positioning of the mobile device 199 of the user is 197 is desired. As shown, the commissioned luminaire identifier settings 126A-W store luminaire identifiers 110A-W. The set of commissioned location coordinates 127A-W include two components: an X location coordinate and a Y location coordinate for each of the commissioned luminaires 110A-W.

The luminaire node map 125 has multiple commissioned luminaire identifier settings 126A-W, including a respective commissioned luminaire identifier setting 126A-W of each commissioned luminaire 110A-W in the indoor space 105. The luminaire node map 125 also has multiple sets of commissioned location coordinates 127A-W. Each set of commissioned location coordinates 127A-W is stored in association with the respective commissioned luminaire setting 126A-W. A two-dimensional Cartesian coordinate system is used in the example luminaire node map 125 for each of the sets of commissioned location coordinates 127A-T. However, a three-dimensional coordinate system can be used which includes an additional component along a Z axis for depth or height measurement. For example, if the indoor space 105 is a grocery store it can be advantageous to know whether the mobile device 199 is at floor level or near or at the ceiling level. A grocery store aisle may include several objects of interest, such a cereal boxes stacked on top of various shelves of an aisle, in which case only knowing the X location coordinate and the Y location coordinate is useful, but also knowing the Z location coordinate is even more useful.

FIG. 1D is an isometric view of a luminaire 110A mounted in the indoor space 105. In the example of FIG. 1D, the drop light fixture type luminaire 110A was hung below the ceiling by multiple support rods or cables attached to a number of brackets on the luminaire 110A. The example of FIG. 1D represents a pendant type light fixture implementation of the luminaire 110A in which the fixture has a bracket on a surface opposite the artificial illumination lighting output, providing an attachment point for a single strut attached to or through the ceiling. Other aspects of structure, orientation and operation of the luminaire 110A are generally similar to those of the luminaires 110A-Z discussed herein. Location of electronics should be decided (e.g. in ceiling or on fixture) size and weight considerations, since fixture weight may be an issue. For example, the electronics of the lighting device may be in the suspended luminaire portion or included in or near the support structure in our above the ceiling to reduce the weight held below the ceiling by the support(s) and bracket(s).

FIG. 2A is a schematic of the luminaire-based positioning system 100 of FIG. 1A similar to FIG. 1B showing that twenty of the initially commissioned luminaires 110A-W are operational commissioned luminaires 110A-T, but three of the initially commissioned luminaires 110A-W have become non-operational commissioned luminaires 110U-W. FIG. 2B is an adjusted luminaire node map 225 generated in response to detecting the three non-operational commissioned luminaires 110U-W (e.g., which have lost communication or are otherwise dead RF positioning nodes), to self-heal the luminaire node map 125. The three non-operational commissioned luminaires 110U-W have been removed from the adjusted luminaire node map 225 and a flag previously raised for installers to physically remove the non-operational commissioned luminaires 110U-W from the ceiling and replace with the uncommissioned luminaires 110X-Z.

Generally described, the luminaire-based positioning system 100 includes a networked lighting system in which each luminaire 110A-Z is a networked node that can measure the received signal strength indicator (RSSI) of digital packet transmissions from other luminaires 110A-Z. That is, luminaire 110A can detect a signal from luminaire 110B and can associate an RSSI value (power reading) with that signal. Presuming also that failed luminaires in the luminaire-based positioning system 100 have been identified by wireless polling or some other means (e.g., visual identification of non-responsive luminaires) and physically replaced, then the back-end (e.g., gateway 120 and/or cloud computing device 166) of the luminaire-based positioning system 100 can implement the following functions.

First, the back-end identifies the luminaire identifiers of the replacement luminaires by wireless polling. Either on command or on some schedule (e.g., at regular intervals), the back end polls the network for luminaire identifiers, seeking those that are not already in the luminaire node map 125. Second, the back-end collects RSSI measurements and luminaire identifiers from the already-mapped luminaires that can detect a signal from each replacement luminaire. Either on command, on a schedule, or (preferably) when one or more new luminaire identifiers are detected, the back-end polls the network for RSSI measurements: e.g., all commissioned luminaires are ordered to report the originating luminaire identifiers and corresponding RSSIs of all packets received in a given interval of time. The back-end then makes a list of commissioned luminaires receiving packets from each new luminaire with corresponding RSSI values. Commissioned luminaires farther from each new luminaire will tend to see lower RSSIs for its signal. Third, the back-end estimates the (x, y) coordinates of each replacement luminaire from the RSSI data of the second step and the location coordinates of detecting luminaires as recorded in the luminaire node map 125. Fourth, the back-end makes a best-fit assignment of the replacement luminaire to commissioned luminaire positions based on the (x, y) estimates, thus "self-healing" the luminaire node map 125 by creating an adjusted luminaire node map 225.

In some examples, one or three-dimensional coordinates are used for the multiple sets of location coordinates 127A-W instead of two-dimensional coordinates—there is no restriction to planar arrays. Data other than or additional to RSSI measurements are used in position estimation, such as the multiple sets of commission location coordinates 127A-W. RSSI and/or other measurements by ancillary devices such stationary or non-luminaire mobile device 199 are used in position estimation. RSSI and other measurements made by the replacement luminaires themselves are used in position estimation. Various geometric position-estimation algorithms use the positional data to estimate the coordinates of individual replacement luminaires. Various algorithms are used to assign luminaire identifiers to the multiple sets of commissioned location coordinates 127A-W to produce a "best fit." Various iterative algorithms are used to refine commissioned luminaire assignments.

In the discussion of FIGS. 2A-B below, functions are divided in the luminaire-based positioning system 100, such that the gateway 120 initially detects which of the commissioned luminaires 110A-W are operational commissioned luminaires 110A-T, non-operational commissioned luminaires 110U-W, and uncommissioned luminaires 110X-Y. Next, the gateway 120 then sends to the cloud computing device 166: (i) a respective uncommissioned luminaire identifier 110X-Z, (ii) a neighboring commissioned luminaire list 135A-C, and (iii) a respective RSSI measurement 136A-C; (b) the luminaire node map 125; (c) a non-operational commissioned luminaire list 131; and (d) the uncommissioned luminaire list 132. For example, the three data parameters (i), (ii), and (iii) are collectively aggregated into a JavaScript Object Notation (JSON) format file, which is then sent from the gateway 120 to the cloud computing device 166. Finally, the cloud computing device 166 then performs the remainder of the processing to adjust the luminaire node map 125 and then sends the adjusted luminaire node 225 map back to the gateway 120.

Initially, execution of the gateway self-healing programming 128 by the gateway processor 123 configures the gateway 120 to implement the following functions. Gateway 120 sends, via the gateway local wireless network communication interface 122A, a health status request message 129A-W to each commissioned luminaire 110A-W requesting a health status response message 130A-W. In response to sending the health status request message 129A-W to each commissioned luminaire 110A-W, the gateway 120 receives from operational commissioned luminaires 110A-T the health status response message 130A-T indicating the commissioned luminaire identifier 110A-T. Further in response to sending the health status request message 129A-W to each commissioned luminaire 110A-W, the gateway 120 fails to receive from non-operational commissioned luminaires 110U-W the health status response message 130U-W indicating the commissioned luminaire identifier 110U-W. Further in response to sending the health status request message 129A-W to each commissioned luminaire 110A-W, the gateway 120 stores the commissioned luminaire identifier 110U-W of each of the non-operational commissioned luminaires 110U-W in a non-operational commissioned luminaire list 131. In some examples, the gateway 120 does not send a health status request message 129A-W, the commissioned luminaires 110A-W could be determined as non-operational based on a non or weak response to any type of message, or failure to initiate a periodic message that is initiated by the luminaires 110A-W rather than the gateway 120. The gateway 120 also does not need to be a local device.

Gateway 120 receives, via the gateway local wireless network communication interface 122A, a respective uncommissioned luminaire identifier 110X-Z from a plurality of uncommissioned luminaires 110X-Z in the indoor space 105. Gateway 120 stores the respective uncommissioned luminaire identifier 110X-Z of the uncommissioned luminaires 110X-Z in an uncommissioned luminaire list 132. Gateway 120 sends, via the gateway local wireless network communication interface 122A, a scan request message 133X-Z to each uncommissioned luminaire 110X-Z requesting a scan response message 134X-Z.

As described herein, a neighboring commissioned luminaire is adjacent or relatively close enough in proximity to an uncommissioned luminaire to enable direct radio frequency (RF) communication or visible light communication (VLC) communication between the neighboring commissioned luminaire and the uncommissioned luminaire to allow a direct RSSI measurement to be taken between the neighboring commissioned luminaire and the uncommissioned luminaire. The farther the uncommissioned luminaire is from the neighboring commissioned luminaire, the lower the direct RSSI measurement becomes. However, in some examples, an RSSI measurement threshold may be used to screen out a neighborhood commissioned luminaire that can directly communicate with the uncommissioned luminaire, but has a RSSI measurement with a value below the RSSI measurement threshold, and is practically speaking too far away.

In the example of FIGS. 2A-B, for uncommissioned luminaire 110X, the neighboring commissioned luminaires and the received commissioned luminaire identifiers are 110E, 110J, and 110V. For uncommissioned luminaire 110Y, the neighboring commissioned luminaires and the received commissioned luminaire identifiers are 110I, 110J, and 110O. For uncommissioned luminaire 110Z, the neighboring commissioned luminaires and the received commissioned luminaire identifiers are 110N, 110O, and 110T.

In response to sending the scan request message 133X-Z to each uncommissioned luminaire 110X-Z, the gateway 120 receives from each of the uncommissioned luminaires 110X-Z the scan response message 134X-Z including: (i) the respective uncommissioned luminaire identifier 110X-Z, (ii) a neighboring commissioned luminaire list 135A-C of commissioned luminaire identifiers of neighboring commissioned luminaires. The scan response message 134X-Z further includes: (iii) a respective received signal strength indicator (RSSI) measurement 136A-C of the uncommissioned luminaire to each of the neighboring commissioned luminaires. The signal strength indicator is not limited to RSSI and could be other types of signal strength indicia. For example, for uncommissioned luminaire 110X, RSSI measurements 136A-C are received for neighboring commissioned luminaires 110E, 110J, and 110V, respectively. The scan request message 133X-Z message does not need to be sent by the gateway 120. The uncommissioned luminaires 110X-Z could be responsible for initiating scans on their own (e.g., periodically).

In response to receiving from each of the uncommissioned luminaires 110X-Z the scan response message 134X-Z, the gateway 120 sends, via the gateway WAN communication interface 122B, to the cloud computing device 166: (a) (i) the respective uncommissioned luminaire identifier 110X-Z, (ii) the neighboring commissioned luminaire list 135A-C, and (iii) the respective RSSI measurement 136A-C; (b) the luminaire node map 125; (c) the non-operational commissioned luminaire list 131; and (d) the uncommissioned luminaire list 132.

By sending (a POST call) all three lists mentioned above are aggregated in one JSON file. The JSON file is a file that stores simple data structures and objects in JavaScript Object Notation (JSON) format, which is a standard data interchange format that can be used to transmit data between the gateway self-healing programming 128 (e.g., a web application running on gateway 120) and the cloud computing device self-healing programming 170 (e.g., a server running on cloud computing device 166). The cloud computing device self-healing programming 170 can be structured as a microservice—a software development technique that is a variant of the service-oriented architecture (SOA) architectural style that structures an application as a collection of loosely coupled services, where the services are fine-grained and the protocols are lightweight.

Next, execution of the cloud computing device self-healing programming 170 by the cloud computing device processor 168 configures the cloud computing device 166 to implement the following functions. For each of the uncommissioned luminaires 110X-Z in the uncommissioned luminaire list 132, cloud computing device 166 calculates a respective distance 171A-C between an uncommissioned luminaire 110X-Z to each of the neighboring commissioned luminaires based on the respective RSSI measurement 136A-C. The lower the RSSI measurement 136A-C, the greater the respective distance 171A-C between the neighboring commissioned luminaire and the uncommissioned luminaire 110X-Z. For each of the uncommissioned luminaires 110X-Z in the uncommissioned luminaire list 132, based on the calculated respective distance 171A-C to each of the neighboring commissioned luminaires and the set of commissioned location coordinates of each of the neighboring commissioned luminaires, cloud computing device 166 estimates a set of uncommissioned location coordinates 172A-C (e.g., centroid) of the uncommissioned luminaire 110X-Z. This is one way of estimating the set of uncommissioned location coordinates 172A-C. In some examples, estimating the set of uncommissioned location coordinates 172A-C of the uncommissioned luminaire 110X-Z includes: removing neighboring commissioned luminaires from the neighboring commissioned luminaire list based on the respective signal strength indicator measurement being weak (e.g. below a threshold value); and estimating a set of uncommissioned location coordinates 172A-C of the uncommissioned luminaire 110X-Z by calculating a centroid between remaining neighboring commissioned luminaire list.

Finally, cloud computing device 166 determines a best fit assignment (e.g., nearest) of the set of uncommissioned location coordinates 172A-C of the uncommissioned luminaires 110X-Z in the uncommissioned luminaire list 132 to the set of commissioned location coordinates 127U-W of the non-operational commissioned luminaires 110U-W in the non-operational commissioned luminaire list 131. However, the self-healing can proceed even if a first number of uncommissioned luminaires is less than a second number of non-operational commissioned luminaires or vice versa. Cloud computing device 166 adjusts the luminaire node map 125 for each of the non-operational commissioned luminaires 110U-W based on the determined best fit assignment by replacing the respective commissioned luminaire identifier setting 126U-W of a respective non-operational commissioned luminaire 110U-W stored in association with the set of commissioned location coordinates 127U-W with the respective uncommissioned luminaire identifier 110X-Z that best fit the commissioned location coordinates 127U-W.

As shown in the specific example of FIGS. 2A-B, the commissioned luminaire identifier setting 126U previously set to 110U in the luminaire node map 125 is replaced with 110X in the adjusted luminaire node map 225. The commissioned luminaire identifier setting 126V previously set to 110V in the luminaire node map 125 is replaced with 110Y in the adjusted luminaire node map 225. The commissioned luminaire identifier setting 126W previously set to 110W in the luminaire node map 125 is replaced with 110Z in the adjusted luminaire node map 225. Accordingly, luminaires 110X-Z occupy commissioned luminaries positions 21-23 in the adjusted luminaire node map 225. Cloud computing device 166 sends, via the cloud computing device WAN communication interface 167, to the gateway 120 the adjusted luminaire node map 225. For example, the adjusted luminaire node map 225 is sent from the cloud computing device 166 to the gateway 120 as a JSON format file.

It should be noted that in some examples determining the best fit assignment of the set of uncommissioned location coordinates 172A-C of the uncommissioned luminaires 110X-Z in the uncommissioned luminaire list 132 can further include reassigning the operational commissioned luminaires 110A-W in the luminaire node map 125 that were previously incorrectly assigned to the set of commissioned location coordinates 127A-W. For example, assume that uncommissioned luminaire 110X is correctly assigned to commissioned luminaire position 21 in the adjusted luminaire node map 225, but uncommissioned luminaire 110Y is incorrectly assigned luminaire position 23 and uncommissioned luminaire 110Z is incorrectly assigned commissioned luminaire position 22. Subsequently, if commissioned luminaire 110Z becomes a non-operational commissioned luminaire, then the assignments can be iteratively revisited and corrected by swapping commissioned luminaire positions 22 and 23.

It is possible that a given non-operational commissioned luminaire is closest to more than one uncommissioned luminaire: i.e., uncommissioned location coordinates may bunch around the set of location coordinates of a single non-operational commissioned luminaire. In this case, since more than one uncommissioned luminaire cannot occupy one set of location coordinates, a tie-breaking algorithm can be used. In an example, the uncommissioned luminaire whose estimated set of uncommissioned location coordinates is closest to the set of location coordinates of the single non-operational commissioned luminaire will be assigned it and the other uncommissioned luminaires in the bunch will be assigned to the sets of location coordinates of the remaining non-operational commissioned luminaires, with any additional ties being resolved in the same way.

Subsequently, execution of the gateway self-healing programming 128 by the gateway processor 123 configures the gateway 120 to implement the following functions. Gateway 120 receives, via the gateway WAN communication interface 122B, from the cloud computing device 166 the adjusted luminaire node map 225. Gateway 120 replaces the luminaire node map 125 with the adjusted luminaire node map 225. After replacing the luminaire node map 125 with the adjusted luminaire node map 225, the gateway 120 can determine a physical location 198 of a mobile device 199 of a user 197 in the indoor space 105 based on the adjusted luminaire node map 225.

Functions in the luminaire-based positioning system 100 can be divided (i.e., distributed) differently. For example, the processing to adjust the luminaire map 125 may be performed entirely on the gateway 120 or luminaires 110A-Z. Hence, gateway 120 can perform all or a subset of any of the functions described as a result of the execution of the gateway self-healing programming 128 in the gateway memory 124 by the gateway processor 123 of the gateway 120. Cloud computing device 166 can perform all or a subset of any of the functions described as a result of the execution of cloud computing device self-healing 170 in cloud computing device memory 169 by the cloud computing device processor 168 of the cloud computing device 166. Luminaires 110A-Z can perform all or a subset of any of the functions described as a result of the execution of luminaire self-healing 116 in luminaire memory 114 by the luminaire processor 115 of the luminaires 110A-Z.

In a first example, the cloud computing device 166 is eliminated from the luminaire-based positioning system 100 and the gateway 120 performs the self-healing functions that were implemented on the cloud computing device 166. Execution of the gateway self-healing programming 128 by the gateway processor 123 configures the gateway 120 to implement the following functions. In response to sending the scan request message 133X-Z to each uncommissioned luminaire 110X-Z, gateway 120 calculates a respective distance 171A-C between an uncommissioned luminaire 110X-Z to each of the neighboring commissioned luminaires based on the respective RSSI measurement 136A-C. Further in response to sending the scan request message 133X-Z to each uncommissioned luminaire 110X-Z, based on the calculated respective distance 171A-C to each of the neighboring commissioned luminaires and the set of commissioned location coordinates of each of the neighboring commissioned luminaires, gateway 120 estimates a set of uncommissioned location coordinates 172A-C(e.g., centroid) of the uncommissioned luminaire 110X-Z. Gateway 120 determines a best fit assignment of the uncommissioned location coordinates 172A-C of the uncommissioned luminaires 110X-Z in the uncommissioned luminaire list 132 to the set of commissioned location coordinates 127U-W of the non-operational commissioned luminaires 110U-W in the non-operational commissioned luminaire list 131. Gateway 120 adjusts the luminaire node map 125 for each of the non-operational commissioned luminaires 110U—W based on the determined best fit assignment by replacing the respective commissioned luminaire identifier setting 126U-W of a respective non-operational commissioned luminaire 110U-W stored in association with the set of commissioned location coordinates 127U-W with the respective uncommissioned luminaire identifier 110X-Z that best fit the commissioned location coordinates 127U-W.

Due to environmental factors (e.g., obstacles, reflections, etc.), relative RSSI measurements 136A-C do not always correspond to relative distances 171A-C. This can lead to erroneous assignment of uncommissioned luminaires 110X-Z in the luminaire node map 125. However, even approximately correct assignments will enable new luminaires 110X-Z to function in the luminaire-based positioning system 100, albeit with degraded performance.

Depending on the geometry of a given indoor space 105 and layout of an array of the luminaires 110A-Z, there can be some limit on the number of new uncommissioned luminaires accommodated. That is, there can be too few luminaires with known locations making RSSI measurements to enable estimation of the locations of the new luminaires. On the other hand, in some arrays whose M luminaires have known (x, y) locations, matrix methods and mutual RSSI measurements can be used to derive a best fit assignment of any number of luminaires up to and including M. This is possible (in cases) because purely mutual signal measurements of luminaires having initially unknown locations can contain spatial information: e.g., for a large planar luminaire array of all-new nodes, nodes that detect more neighbors are probably interior to the array while those that detect fewer neighbors are probably at or near its edges. Depending on array geometry, therefore, it is possible to completely bootstrap a node map. All such approaches are contemplated. However, in practice it is preferable that the majority of luminaires in an array be functional and in the luminaire node map 125 when used to commission a number of replacement luminaires.

FIG. 3 is a block diagram of a gateway 120 that communicates via the luminaire-based positioning system 100 of FIGS. 1A-B and 2A. As previously described in FIGS. 1A-B and 2A, the gateway 120 includes the gateway network communication interface system 121, the gateway processor 123, and the gateway memory 124. Gateway memory 124 of FIG. 3, cloud computing device memory 169 of FIG. 4, and luminaire memory 114 of FIG. 5 each include memories/storage, such as a random access memory and/or a read-only memory to store data, as well as programs stored in one or more of the memories/storage. As shown in FIG. 3, the gateway memory 124 can, for example, store the luminaire node map 125, health status request messages 129A-W, health status response messages 130A-T, non-operational commissioned luminaire list 131, uncommissioned luminaire list 132, scan request messages 133X-Z, and scan response messages 134X-Z. Gateway memory 124 also stores gateway self-healing programming 128, which, when executed by the gateway processor 123, reads the luminaire node map 125 as input in step A, and then implements steps B-H to implement self-healing of the luminaire node map 125 as outlined in, for example, FIGS. 2A-B above.

Figure 5:
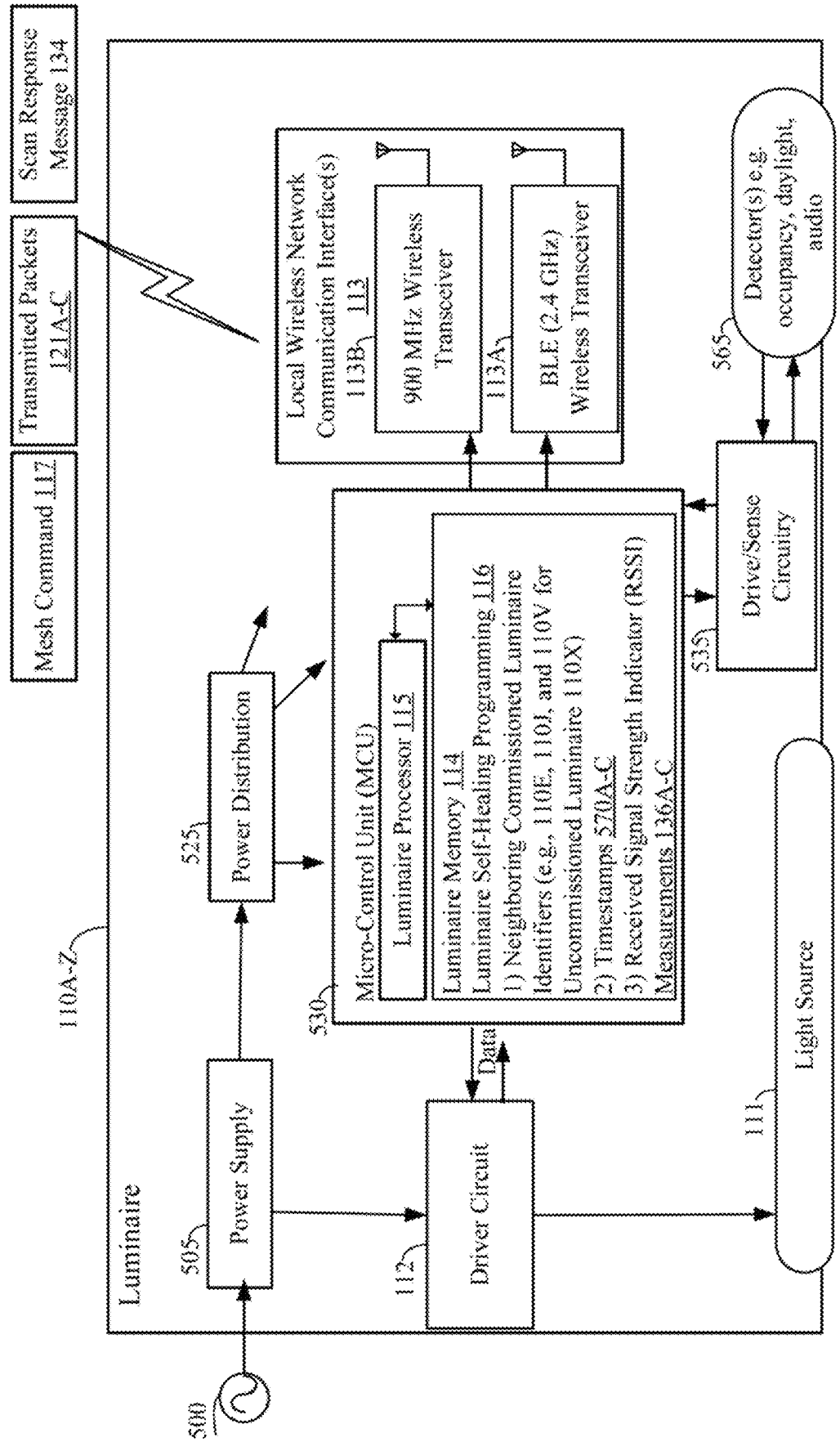
FIG. 5 is a block diagram of a luminaire that communicates via the luminaire-based positioning system of FIGS. 1A-B and 2A.

Gateway processor 123 of FIG. 3, cloud computing device processor 168 of FIG. 4, and luminaire processor 115 of FIG. 5, each include a central processing unit (CPU), shown by way of example as a microprocessor (µP), although other processor hardware may serve as the CPU. The CPU and memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the gateway processor 123, cloud computing device processor 168, and luminaire processor 115, which can include one or more cores. Although the illustrated examples of gateway processor 123, cloud computing device processor 168, and luminaire processor 115 include only one microprocessor, for convenience, a multi-processor architecture can also be used.

FIG. 4 is a block diagram of a cloud computing device 166 that communicates via the luminaire-based positioning system 100 of FIGS. 1A-B and 2A. As previously described in FIGS. 1A-B and 2A, the cloud computing device 166 includes the cloud computing device WAN communication interface 167, the cloud computing device processor 168, and the cloud computing device memory 169. As shown, the cloud computing device memory 169 can, for example, store the luminaire node map 125, non-operational commissioned luminaire list 131, uncommissioned luminaire list 132, collected data from scan response messages 134X-Z, calculated respective distances 171A-C, estimated set of uncommissioned location coordinates 172A-C, and the adjusted luminaire node map 225. Cloud computing device memory 169 also stores cloud computing device self-healing programming 170, which, when executed by the cloud computing device processor 168, reads the luminaire node map 125 as input in block A, and then implements blocks B-H to implement self-healing of the luminaire node map 125 as outlined in, for example, FIGS. 2A-B above.

An example method executed on various devices shown in FIG. 1A, including one or both of the gateway 120 of FIG. 3 and the cloud computing device 166 of FIG. 4, includes generating a non-operational commissioned luminaire list 131 including a respective commissioned luminaire identifier 110U-W of a plurality of non-operational commissioned luminaires 110U-W. The method further includes receiving, via a local wireless communication network 106 or a secondary network 107, from each of a plurality of uncommissioned luminaires 110X-Z: (i) a respective uncommissioned luminaire identifier 110X-Z, (ii) a neighboring commissioned luminaire list 135A-C of commissioned luminaire identifiers of neighboring commissioned luminaires, and (iii) a respective signal strength indicator measurement 136A-C of the uncommissioned luminaire 110X-Z to each of the neighboring commissioned luminaires. The method further includes for each of the uncommissioned luminaires 110X-Z in the uncommissioned luminaire list 132, estimating a set of uncommissioned location coordinates 172A-C of the uncommissioned luminaire. Estimating the set of uncommissioned location coordinates 172A-C of the uncommissioned luminaire 110X-Z includes removing neighboring commissioned luminaires from the neighboring commissioned luminaire list 135A-C based on the respective signal strength indicator measurement 136A-C. Estimating the set of uncommissioned location coordinates 172A-C of the uncommissioned luminaire 110X-Z further includes calculating a centroid between remaining neighboring commissioned luminaires in the neighboring commissioned luminaire list 135A-C. The method further includes determining a best fit assignment of the set of uncommissioned location coordinates 172A-C of the uncommissioned luminaires 110X-Z in the uncommissioned luminaire list 132 to the set of commissioned location coordinates 127U-W of the non-operational commissioned luminaires 110U-W in the non-operational luminaire list 131. The method further includes adjusting a luminaire node map 125 for each of the non-operational commissioned luminaires 110U—W based on the determined best fit assignment.

Although described in terms of luminaires 110A-Z and an indoor space (e.g., on premises), the luminaires 110A-Z are just one example of a deployment environment of an RF positioning node, which can be deployed in other ways. Hence, the RF positioning nodes do not need to include the light source 111, driver circuit 112, drive/sense circuitry 535, and detector(s) 565 components. Moreover, the RF positioning nodes deployed on-premises do not need to be installed in an indoor space 105, but can instead be installed in an outdoor space. Accordingly, a more general method executed on various devices shown in FIG. 1A, including one or both of the gateway 120 of FIG. 3 and the cloud computing device 166 of FIG. 4, includes generating a non-operational commissioned radio frequency (RF) positioning node list including a respective commissioned RF positioning node identifier of a plurality of non-operational commissioned RF positioning nodes. The method further includes receiving, via a local wireless communication network 106 or a secondary network 107, from each of a plurality of uncommissioned RF positioning nodes: (i) a respective uncommissioned RF positioning node identifier, (ii) a neighboring commissioned RF positioning node list of commissioned RF positioning node identifiers of neighboring commissioned RF positioning nodes, and (iii) a respective signal strength indicator measurement 136A-C of the uncommissioned RF positioning node to each of the neighboring commissioned RF positioning nodes. The method further includes for each of the uncommissioned RF positioning nodes in the uncommissioned RF positioning node list, estimating a set of uncommissioned location coordinates 172A-C of the uncommissioned RF positioning node. Estimating the set of uncommissioned location coordinates 172A-C of the uncommissioned RF positioning node includes removing neighboring commissioned RF positioning nodes from the neighboring commissioned RF positioning node list based on the respective signal strength indicator measurement 136A-C. Estimating the set of uncommissioned location coordinates 172A-C of the uncommissioned RF positioning node further includes calculating a centroid between remaining neighboring commissioned RF positioning nodes in the neighboring commissioned RF positioning node list. The method further includes determining a best fit assignment of the set of uncommissioned location coordinates 172A-C of the uncommissioned RF positioning nodes in the uncommissioned RF positioning node list to the set of commissioned location coordinates 127U-W of the non-operational commissioned RF positioning nodes in the non-operational RF positioning node list. The method further includes adjusting an RF positioning node map for each of the non-operational commissioned RF positioning nodes based on the determined best fit assignment.

FIG. 5 is a block diagram of a luminaire 110A-Z that communicates via the luminaire-based positioning system of FIGS. 1A-B and 2A. Luminaire 110A-Z is an integrated light fixture that generally includes a power supply 505 driven by a power source 500. Power supply 505 receives power from the power source 500, such as an AC mains, battery, solar panel, or any other AC or DC source. Power supply 505 may include a magnetic transformer, electronic transformer, switching converter, rectifier, or any other similar type of circuit to convert an input power signal into a power signal suitable for luminaire 110A-Z.

Luminaire 110A-Z furthers include the driver circuit 112 and the light source 111. Driver circuit 112 is coupled to light source 111 and drives that light source 111 by regulating the power to light source 111 by providing a constant quantity or power to light source 111 as its electrical properties change with temperature, for example. Driver circuit 112 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 112 is manufactured by EldoLED™.

Driver circuit 112 can further include an AC or DC current source or voltage source, a regulator, an amplifier (such as a linear amplifier or switching amplifier), a buck, boost, or buck/boost converter, or any other similar type of circuit or component. Driver circuit 112 outputs a variable voltage or current to the light source 111 that may include a DC offset, such that its average value is nonzero, and/or an AC voltage. For purposes of communication and control, luminaire 110A-Z can be treated as single addressable device that can be configured to operate as a member of one or more lighting control groups or zones. The luminaire 110A-Z is line powered and remains operational as long as power is available.

Luminaire 110A-Z also includes a dual-band wireless radio communication interface 113 system that includes two local wireless network communication interfaces 113A-B (transceivers). It should be understood that "dual-band" means communications over two separate RF bands. The communication over the two separate RF bands can occur simultaneously (concurrently); however, it should be understood that the communication over the two separate RF bands may not actually occur simultaneously. In our example, luminaire 110A-Z has a radio set that includes radio 113B for sub-GHz communications and another radio 113A for Bluetooth RF communications. Transport layer methods ride on the network layer function of the local wireless network communication interfaces 113A-B.

Luminaire 110A-Z includes power distribution circuitry 525, a micro-control unit (MCU) 530, drive/sense circuitry 535, and detector(s) 565. As shown, MCU 530 is coupled to driver circuit 112 and controls the light source operation of the light source 111. MCU 530 includes a luminaire memory 114 (volatile and non-volatile) and a luminaire processor 115 (CPU). The luminaire memory 114 includes the luminaire self-healing programming 116 (which can be firmware) for self-healing and the depicted data of neighboring commissioned luminaire identifiers, timestamps 570A-C (e.g., date and time), and RSSI measurements 136A-C to the neighboring commissioned luminaires. Luminaire 110A-Z includes additional programming logic in the luminaire memory 114 for lighting control operations and commissioning, maintenance, and diagnostic operations. The power distribution circuitry 525 distributes power and ground voltages to the MCU 530, drive/sense circuitry 535, wireless transceivers 113A-B, and detector(s) 565 to provide reliable operation of the various circuitry.

As shown, luminaire 110A-Z includes detector(s) 565, such as an in-fixture daylight sensor, an occupancy sensor, an audio sensor, a temperature sensor, or other environmental sensor. Detector(s) 565 may be based on Acuity Brands Lighting's commercially available xPoint® Wireless ES7 product. Drive/sense circuitry 535, such as application firmware, drives the in-fixture occupancy, audio, and photo sensor hardware. Drive/sense circuitry 535 of luminaire 110A-Z detects state changes in the detector(s) 565, such as occupancy, daylight, and audio sensors.

Luminaires 110A-Z can communicate via a local wireless communication network 106 that is a mesh network. As shown, the luminaire 110A-Z further includes luminaire self-healing programming 116 in the luminaire memory 114. Execution of the luminaire self-healing programming 116 by the luminaire processor 115 configures each uncommissioned luminaire 110X-Z to implement the following functions. In response to receiving the scan request message 133X-Z, each uncommissioned luminaire 110X-Z sends, via the luminaire local network communication interface 113, a mesh command 117 over the mesh network requesting the neighboring commissioned luminaires transmit packets 121A-C including a respective commissioned luminaire identifier and a timestamp 570A-C. For example, for uncommissioned luminaire 110X, the neighboring commissioned luminaires and the received commissioned luminaire identifiers are 110E, 110J, and 110V. Based on the respective commissioned luminaire identifier (e.g., 110E, 110J, and 110V) and the timestamp 570A-C of the transmitted packets 121A-C, each uncommissioned luminaire 110X-Z calculates the respective RSSI measurement 136A-C of the uncommissioned luminaire to each of the neighboring commissioned luminaires. For example, for uncommissioned luminaire 110X, RSSI measurements 136A-C are calculated for neighboring commissioned luminaires 110E, 110J, and 110V, respectively.

Each uncommissioned luminaire 110X-Z sends, via the luminaire local wireless network communication interface 113, the scan response message 134X-Z through a transport layer of the mesh network back to the gateway 120. The scan response message 134X-Z includes: (i) the respective uncommissioned luminaire identifier 110X-Z, (ii) the neighboring commissioned luminaire list 135A-C of commissioned luminaire identifiers of the neighboring commissioned luminaires. For example, for uncommissioned luminaire 110X, the neighboring commissioned luminaires and the received commissioned luminaire identifiers are 110E, 110J, and 110V. The scan response message 134X-Z further includes: (iii) the calculated respective RSSI measurement 136A-C of the uncommissioned luminaire to each of the neighboring commissioned luminaires. For example, for uncommissioned luminaire 110X, RSSI measurements 136A-C are calculated for neighboring commissioned luminaires 110E, 110J, and 110V, respectively.

The scan response message 134X-Z is divided into a plurality of advertisement packets 121A-C (e.g., BLE protocol). Each advertisement packet includes the respective uncommissioned luminaire identifier 110X-Z, the commissioned luminaire identifier of one of the neighboring commissioned luminaires, and the calculated respective RSSI measurement 136A-C. Execution of the gateway self-healing programming 128 by the gateway processor 123 configures the gateway 120 to implement functions to aggregate the plurality of advertisement packets into the scan response message 134X-Z sent from each uncommissioned luminaire 110X—Z based on the respective uncommissioned luminaire identifier 110X-Z.

Figure 6:
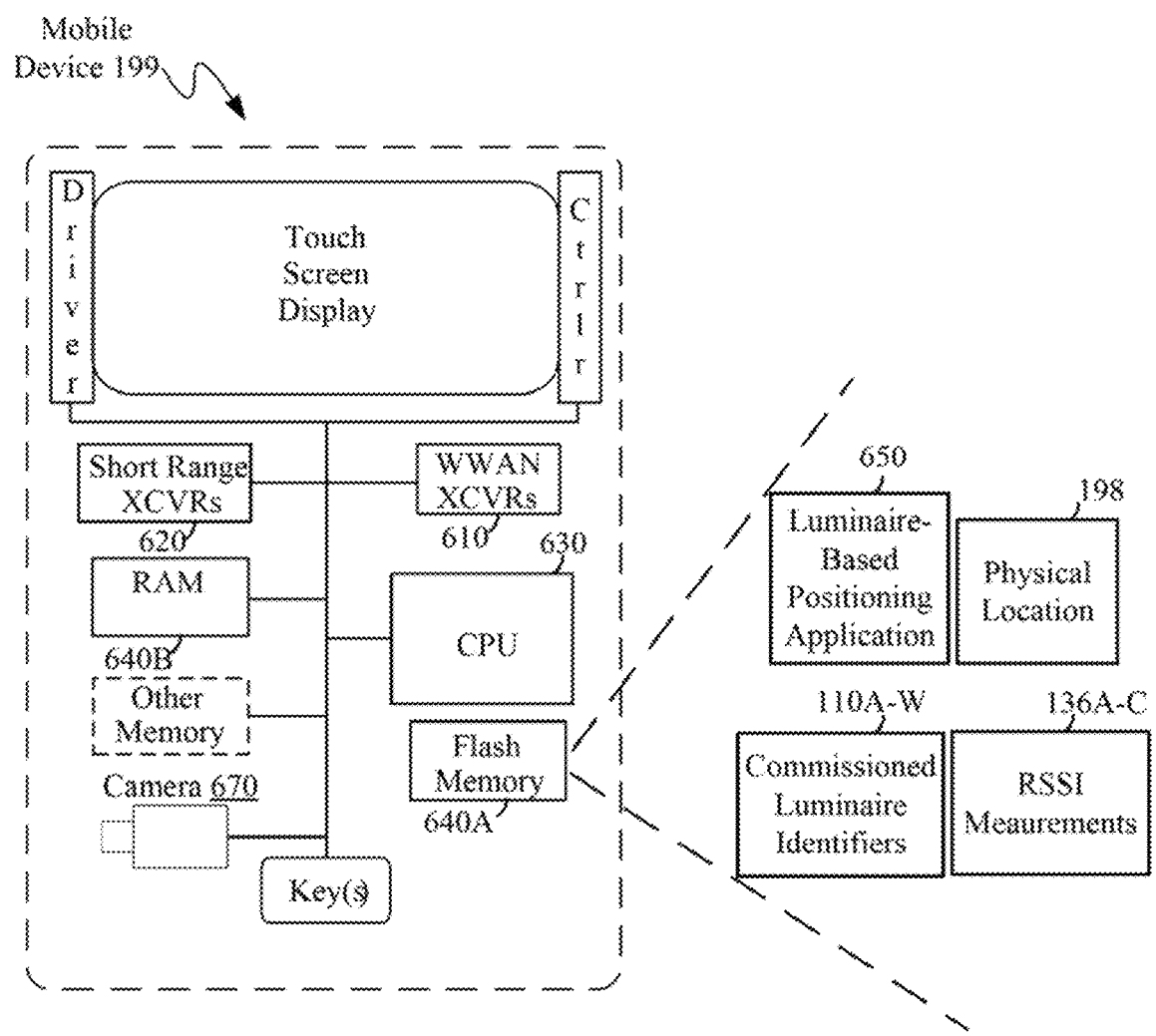
FIG. 6 is a block diagram of the mobile device that communicates via the luminaire-based positioning system of FIGS. 1A-B and 2A.

FIG. 6 is a block diagram of the mobile device 199 that communicates via the luminaire-based positioning system 100 of FIGS. 1A-B and 2A. Shown are elements of a touch screen type of mobile device 199 having a luminaire-based positioning application 650 loaded, although other non-touch type mobile devices can be used in the luminaire-based positioning communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 6 therefore provides a block diagram illustration of the example mobile device 199 having a touch screen display for displaying content and receiving user input as (or as part of) the user interface.

The activities that are the focus of discussions here typically involve data communications related to determining a physical location 198 of a user (e.g., human or robot) of the mobile device 199 traversing or otherwise navigating through the indoor space 105. As shown in FIG. 6, the mobile device 199 includes at least one digital or analog digital transceiver 620, which is a network communication interface for wireless communications. For example, short range XCVR 620 is for short-range digital communication over the local wireless communication network 106, such as NFC, VLC, DECT, ZigBee, Bluetooth, or WiFi. Mobile device 199 can also include a camera 670, such as a rolling shutter camera, for VLC-based positioning RSSI measurements, as described with reference to FIGS. 1A-B above.

Mobile device 199 also includes another wireless wide area network transceiver (WWAN XCVR) 610 for communication over a wide area wireless mobile communication network. The WWAN transceiver 610 (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." In one example, the transceiver 610 sends and receives a variety of signaling messages in support of various data services provided by a network of a wireless service provider, to user(s) via a mobile communication network (not shown).

Transceivers 610, 620 connect through radio frequency (RF) send-and-receive amplifiers (not shown) to an antenna (not shown). For example, transceivers 610, 620 provide two-way wireless communication of information including digitized audio signals, still image and/or video signals, web page information for display as well as web related inputs, and various types of mobile communications to/from the mobile device 199 to the commissioned luminaires 110A-W and/or gateway 120 for detecting the physical location 198A-C of the mobile device 199 of the user 197 in the indoor space 105. Several of these types of communications through the transceivers 610, 620 and a network, as discussed previously, relate to protocols and procedures in support of communications with the commissioned luminaires 110A-W for calculating an indoor position of the mobile device 199. Such communications, for example, may utilize IP packet data transport over the local wireless communication network (e.g., mesh network) 106 utilizing the digital short range wireless transceiver (XCVR) 620.

Mobile device 199 also supports wireless local area network communications over Wi-Fi, instead of or in addition to data communications using Bluetooth. Hence, in the example of FIG. 6, for packet data communications, the mobile device 199 can include multiple short range XCVRs 620, such as both a Wi-Fi transceiver and a Bluetooth transceiver and associated antenna (not shown). Although Bluetooth and Wi-Fi are used here as examples, the transceiver 620 may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX and wireless mesh network standards (e.g., Zigbee).

The mobile device 199 further includes a microprocessor, shown as CPU 630, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 630, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 630 or processor hardware in smartphone, laptop computer, and tablet.

Returning more specifically to the smartphone example of FIG. 6, the microprocessor 630 serves as a programmable host controller for the mobile device 199 by configuring the mobile device 199 to perform various operations, for example, in accordance with instructions or programming executable by processor 630. For example, such operations may include various general operations of the smartphone, as well as operations related to communications with the commissioned luminaires 110A-W and the gateway 120. Although a processor may be configured by use of hardwired logic, typical processors in mobile devices are general processing circuits configured by execution of programming.

The mobile device 199 includes a memory or storage system, for storing data and programming. In the example, the memory system may include a flash memory 640A and a random access memory (RAM) 640B. The RAM 640B serves as short term storage for instructions and data being handled by the processor 630, e.g. as a working data processing memory. The flash memory 640A typically provides longer term storage.

Hence, in the example of mobile device 199, the flash memory 640A is used to store programming or instructions for execution by the processor 320. Depending on the type of device, the mobile device 199 stores and runs a mobile operating system through which specific applications, including a luminaire-based positioning application 650 (which may be a web browser executing a dynamic web page), runs on mobile device 199. Examples of mobile operating systems include Google Android, Apple iOS (I-Phone or iPad devices), Windows Mobile, Amazon Fire OS, RIM BlackBerry operating system, or the like. Flash memory 640A may also be used to store mobile configuration settings for different mobile applications or services executable at mobile device 199 using processor 630. As shown, the flash memory 640A, includes: RSSI measurements 136A-C between the mobile device 199 and the three or more commissioned luminaires 110A-W, commissioned luminaire identifiers 110A-W of the three or more commissioned luminaires 110A-W, and the calculated physical location 198 of the mobile device 199 in the indoor space 105.

Figure 7:
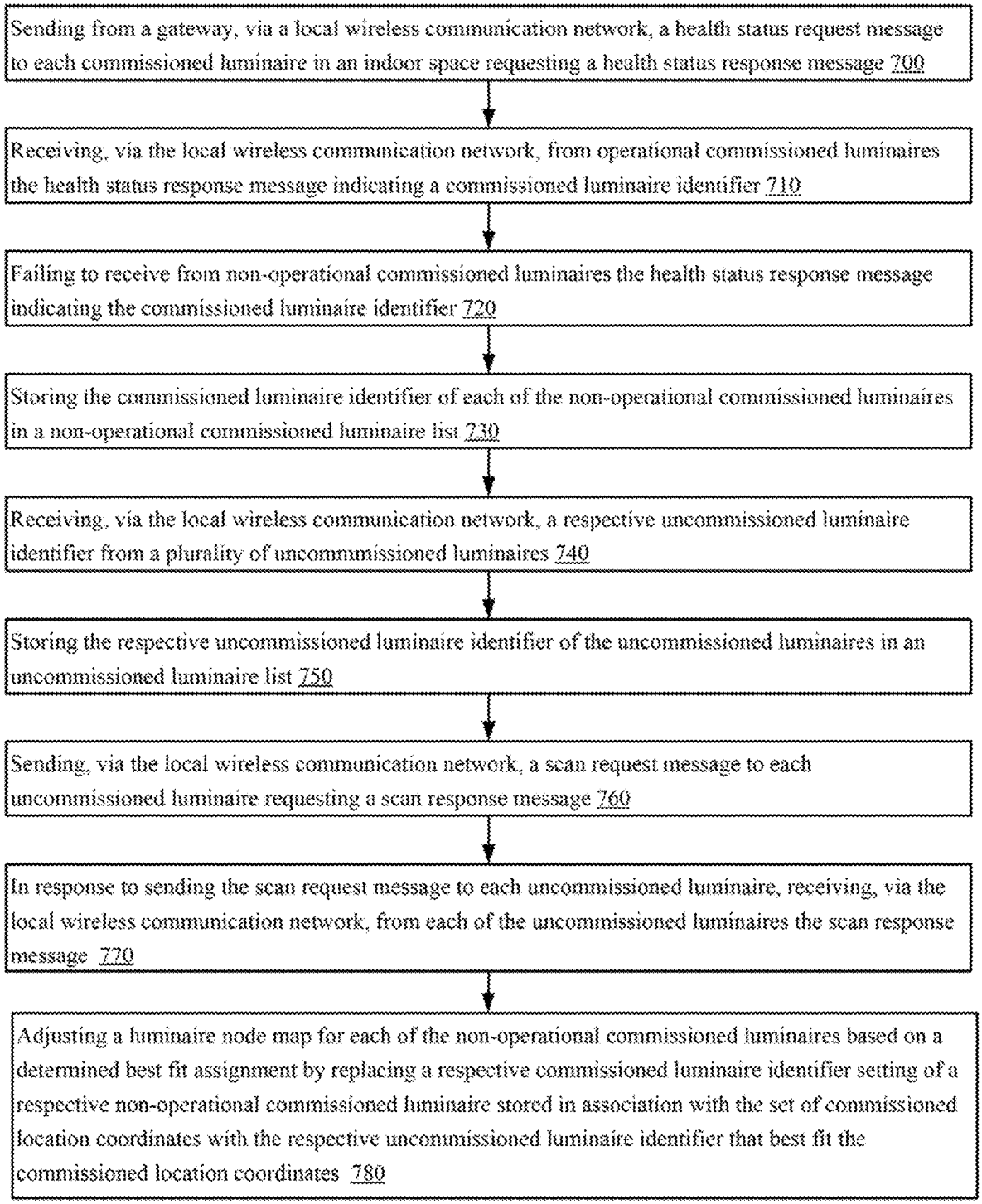
FIG. 7 is a flow chart of a method with steps that can be implemented in the luminaire-based positioning system including the gateway, cloud computing device, and luminaires of FIGS. 1A-B and 2A during self-healing of the luminaire node map.

FIG. 7 is a flowchart of a method with steps that can be implemented in the luminaire-based positioning system 100 including the gateway 120, cloud computing device 166, and luminaires 110A-Z of FIGS. 1A-B and 2A during self-healing of the luminaire node map 125. Generally blocks 700, 710, 720, and 730 entail generating a non-operational commissioned luminaire list including a respective commissioned luminaire identifier of a plurality of non-operational commissioned luminaires. This just one way to generate the non-operational commissioned luminaire list and other examples could be determined based on a non or weak response to any type of message, failure to initiate a periodic message that is initiated by the luminaires rather than the gateway 120 (e.g. heartbeat). Beginning in block 700, the method includes sending from a gateway 120, via a local wireless communication network 106, a health status request message 129A-W to each commissioned luminaire 110A-W in an indoor space 105 requesting a health status response message 130A-W.

Proceeding now to block 710, the method further includes in response to sending the health status request message 129A-W to each commissioned luminaire 110A-W, receiving, via the local wireless communication network 106, from operational commissioned luminaires 110A-T the health status response message 130A-T indicating a commissioned luminaire identifier 110A-T. Moving to block 720, the method further includes in response to sending the health status request message 129A-W to each commissioned luminaire 110A-W, failing to receive from non-operational commissioned luminaires 110U-W the health status response message indicating the commissioned luminaire identifier 110U-W. Moving to block 730, the method further includes in response to sending the health status request message 129A-W to each commissioned luminaire 110A-W, storing the commissioned luminaire identifier 110U-W of each of the non-operational commissioned luminaires 110U-W in a non-operational commissioned luminaire list 131.

Continuing to block 740, the method further includes receiving, via the local wireless communication network 106, a respective uncommissioned luminaire identifier 110X-Z from a plurality of uncommissioned luminaires 110X-Z. The uncommissioned luminaire could be responsible for initiating scans on its own (for example periodically) or receive a request to scan. Proceeding now to block 750, the method further includes storing the respective uncommissioned luminaire identifier 110X-Z of the uncommissioned luminaires 110X-Z in an uncommissioned luminaire list 132. Moving to block 760, the method further includes sending, via the local wireless communication network 106, a scan request message 133X-Z to each uncommissioned luminaire 110X-Z requesting a scan response message 134X-Z.

Continuing to block 770, the method further includes in response to sending the scan request message 133X-Z to each uncommissioned luminaire 110X-Z, receiving, via the local wireless communication network 106, from each of the uncommissioned luminaires 110X-Z the scan response message 134X-Z. The scan response message 134X-Z includes: (i) the respective uncommissioned luminaire identifier 110X-Z and (ii) a neighboring commissioned luminaire list 135A-C of commissioned luminaire identifiers of neighboring commissioned luminaires. For example, for uncommissioned luminaire 110X, the neighboring commissioned luminaires and the received commissioned luminaire identifiers are 110E, 110J, and 110V. The scan response message 134X-Z further includes: (iii) a respective received signal strength indicator (RSSI) measurement 136A-C of the uncommissioned luminaire to each of the neighboring commissioned luminaires. For example, for uncommissioned luminaire 110X, RSSI measurements 136A-C are received for neighboring commissioned luminaires 110E, 110J, and 110V, respectively.

The method can further include for each of the uncommissioned luminaires 110X-Z in the uncommissioned luminaire list 132: calculating a respective distance 171A-C between an uncommissioned luminaire 110X-Z to each of the neighboring commissioned luminaires. For example, for uncommissioned luminaire 110X, the neighboring commissioned luminaires are 110E, 110J, and 110V based on the respective RSSI measurement 136A-C. The method can further include for each of the uncommissioned luminaires 110X-Z in the uncommissioned luminaire list 132: based on the calculated respective distance 171A-C to each of the neighboring commissioned luminaires and the set of commissioned location coordinates of each of the neighboring commissioned luminaires, estimating a set of uncommissioned location coordinates 172A-C of the uncommissioned luminaire 110X-Z. For example, for neighboring commissioned luminaires 110E, 110J, and 110V of uncommissioned luminaire 110X, the set of commissioned location coordinates are 127E, 127J, and 127V, respectively The method can further include determining a best fit assignment of the set of uncommissioned location coordinates 172A-C of the uncommissioned luminaires 110X-Z in the uncommissioned luminaire list 132 to the set of commissioned location coordinates 127U-W of the non-operational commissioned luminaires 110U-W in the non-operational commissioned luminaire list 131. The method can further include in block 780 adjusting a luminaire node map 125 for each of the non-operational commissioned luminaires 110U—W based on the determined best fit assignment by replacing a respective commissioned luminaire identifier setting 126U-W of a respective non-operational commissioned luminaire 110U-W stored in association with the set of commissioned location coordinates 127U-W with the respective uncommissioned luminaire identifier 110X-Z that best fit the commissioned location coordinates 127U-W. The method can further include determining a physical location 198 of a mobile device 199 of a user 197 in the indoor space 105 based on the adjusted luminaire node map 225.

In a first example, the method further includes before determining the best fit assignment, dividing the luminaire node map 125 of the indoor space 105 into a plurality of luminaire node map clusters 805A-B (e.g., regions) by executing a density based spatial clustering algorithm. The density based spatial clustering algorithm is based on: (i) each set of the uncommissioned location coordinates 172A-C of the uncommissioned luminaires 110X-Z in the uncommissioned luminaire list 132, and (ii) a threshold distance that is a maximum distance for determining whether the set of uncommissioned location coordinates 172A-C resides within a respective luminaire node map cluster 805A-B or not. Determining the best fit assignment of the set of uncommissioned location coordinates 172A-C of the uncommissioned luminaires 110X-Z in the uncommissioned luminaire list 132 is executed on each respective luminaire node map cluster 805A-B utilizing only the uncommissioned luminaires 110X-Z residing within the respective luminaire node map cluster 805A-B.

In a second example, determining the best fit assignment of the set of uncommissioned location coordinates 172A-C of the uncommissioned luminaires 110X-Z in the uncommissioned luminaire list 132 further includes reassigning the operational commissioned luminaires 110A-W in the luminaire node map 125 that were previously incorrectly assigned to the set of commissioned location coordinates 127A-W.

In a third example, the local wireless communication network 106 is a mesh network. The method includes in response to receiving the scan request message 133X-Z at each uncommissioned luminaire 110X-Z: sending a mesh command 117 over the mesh network, requesting the neighboring commissioned luminaires transmit packets 121A-C including a respective commissioned luminaire identifier and a timestamp 570A-C. For example, for uncommissioned luminaire 110X, the neighboring commissioned luminaires and the received commissioned luminaire identifiers are 110E, 110J, and 110V. The method includes further in response to receiving the scan request message 133X-Z at each uncommissioned luminaire 110X-Z: based on the respective commissioned luminaire identifier e.g., 110E, 110J, and 110V) and the timestamp 570A-C of the transmitted packets 121A-C, calculating the respective RSSI measurement 136A-C of the uncommissioned luminaire to each of the neighboring commissioned luminaires. For example, for uncommissioned luminaire 110X, RSSI measurements 136A-C are received for neighboring commissioned luminaires 110E, 110J, and 110V, respectively.

In the third example, the method further includes sending the scan response message 134X-Z through a transport layer of the mesh network back to the gateway 120. The scan response message 134X-Z includes: (i) the respective uncommissioned luminaire identifier 110X-Z and (ii) the neighboring commissioned luminaire list 135A-C of commissioned luminaire identifiers of neighboring commissioned luminaires. For example, for uncommissioned luminaire 110X, the neighboring commissioned luminaires and the received commissioned luminaire identifiers are 110E, 110J, and 110V. The scan response message 134X-Z further includes: (iii) the calculated respective RSSI measurement 136A-C of the uncommissioned luminaire to each of the neighboring commissioned luminaires. For example, for uncommissioned luminaire 110X, RSSI measurements 136A-C are received for neighboring commissioned luminaires 110E, 110J, and 110V, respectively.

Figure 8:
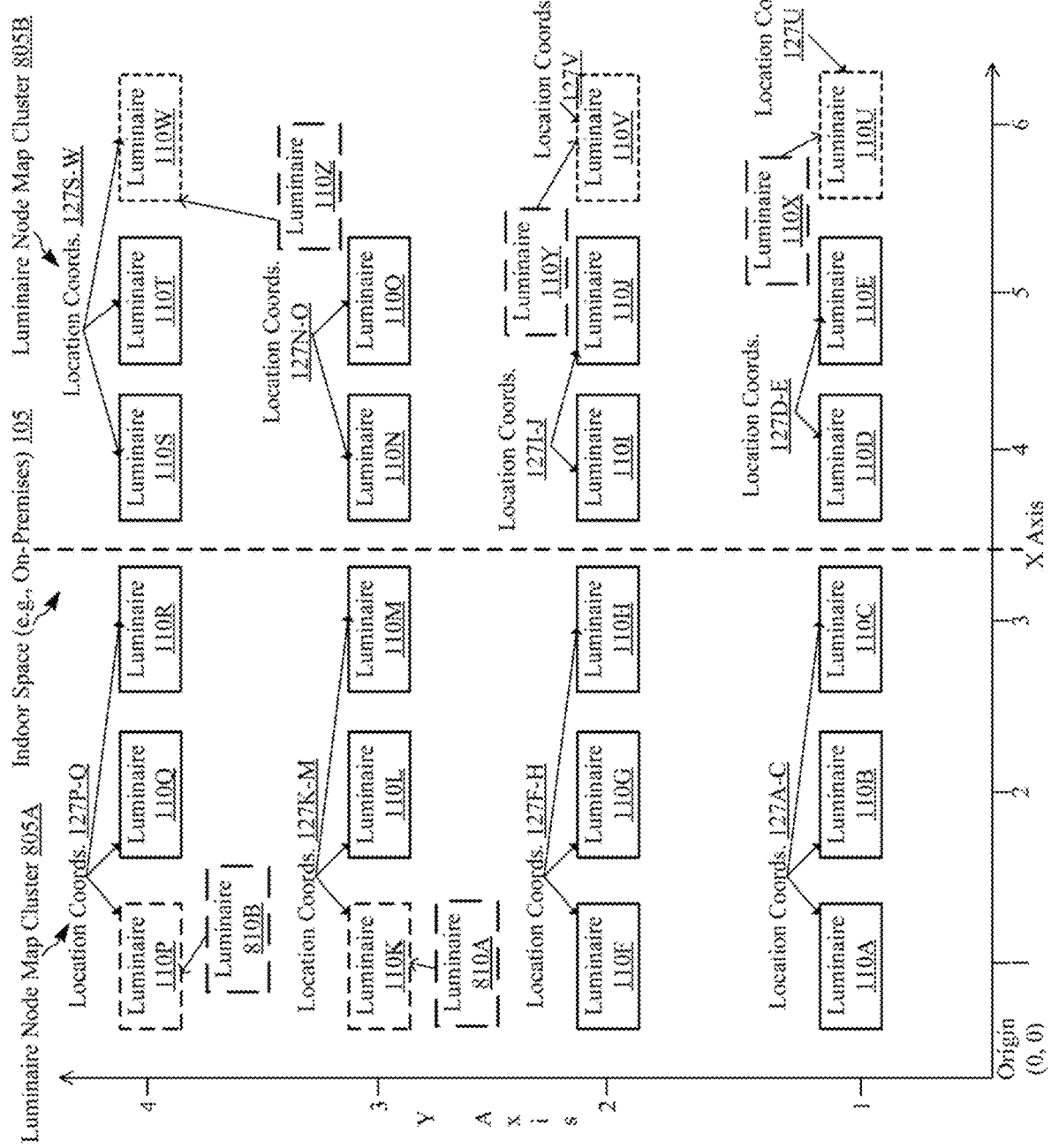
FIG. 8 is a schematic of the luminaire-based positioning system of FIGS. 1A-B showing dividing of the luminaire node map into luminaire node map clusters during self-healing.

FIG. 8 is a schematic of the luminaire-based positioning system of FIGS. 1A-B showing dividing of the luminaire node map 125 into two luminaire node map clusters 805A-B during self-healing. In the example of FIG. 8, before determining the best fit assignment, cloud computing device 166 divides the luminaire node map 125 of the indoor space 105 into a plurality of luminaire node map clusters 805A-B by executing a density based spatial clustering algorithm. One type of density based spatial clustering algorithm is known as density based spatial clustering algorithm with noise (DBSCAN). DBSCAN is a density-based clustering algorithm: given a set of points in some space, it groups together points that are closely packed together (points with many nearby neighbors), marking as outliers points that lie alone in low-density regions (whose nearest neighbors are too far away). When DBSCAN runs, the following input is received: (i) an estimated set of uncommissioned location coordinates 172A-C of the uncommissioned luminaires 110X-Z and an estimated set of uncommissioned location coordinates 172D-E of uncommissioned luminaires 805A-B; and (ii) a threshold distance. In response to the received input, DBSCAN divides the luminaire node map 125 into several (two) smaller luminaire node map clusters 805A-B as shown in FIG. 8.

The best fit assignment as described herein is a combinatorial optimization problem. A naive solution for the best fit assignment problem is to check all the assignments and calculate the cost of each one. This may be very inefficient since there are n! (factorial of n) different assignments. Linear programming solutions can be used in certain circumstances to determine the best fit assignment. However, the luminaire node map cluster based approach advantageously divides the luminaire node map 125 into smaller, localized versions of the best fit assignment problem to reduce the possibility of errors in the best fit assignment algorithm approach.

Accordingly, the density based spatial clustering algorithm is based on: (i) each set of the uncommissioned location coordinates 172A-E of the uncommissioned luminaires 110X-Z and 810A-B in the uncommissioned luminaire list 132; and (ii) a threshold distance. The threshold distance is a maximum distance for determining whether the set of uncommissioned location coordinates 172A-E resides within a respective luminaire node map cluster 805A-B or not. Once the density based spatial clustering algorithm returns the two luminaire node map clusters 805A-B, determining the best fit assignment of the set of uncommissioned location coordinates 172A-E of the uncommissioned luminaires 110X-Z and 810A-B in the uncommissioned luminaire list 132 is executed on each respective luminaire node map cluster 805A-B utilizing only the uncommissioned luminaires 110X-Z and 810A-B residing within the respective luminaire node map cluster 805A-B. In other words, the decision of where to assign uncommissioned luminaires 110X-Z and 810A-B is isolated to only one of the individual luminaire node map clusters 805A-B.

The set of uncommissioned location coordinates 172A-E are estimated based on relative sets of commissioned location coordinates 127A-T of the neighboring commissioned luminaires of the uncommissioned luminaires 110X-Z and 810A-B. In the example of FIG. 8, for uncommissioned luminaire 110X, the neighboring commissioned luminaires are 110E, 110J, and 110V. For uncommissioned luminaire 110Y, the neighboring commissioned luminaires are 110I, 110J, and 110O. For uncommissioned luminaire 110Z, the neighboring commissioned luminaires are 110N, 110O, and 110T. For uncommissioned luminaire 810A, the neighboring commissioned luminaires are 110F, 110G, and 110L. For uncommissioned luminaire 810B, the neighboring commissioned luminaires are 110L, 110M, 110Q, and 110R.

The threshold distance is a maximum distance utilized while determining if a particular set of uncommissioned location coordinates 172A-E of uncommissioned luminaires 110X-Z and 810A-B belongs to a particular luminaire node map cluster 805A-B or not. This threshold distance varies based on the geometry of the luminaires 110A-Z and can be determined dynamically.

Any of the self-healing functionality described herein for the luminaires 110A-Z, gateway 120, cloud computing device 166, and mobile device 199 can be embodied in one more applications as described previously. According to some embodiments, "function," "functions," "application," "applications," "instruction," "instructions," or "programming" are program(s) that execute functions defined in the programs. Various programming languages can be employed to create one or more programs, structured in a variety of manners, such as object-oriented programming languages (e.g., Objective-C, Java, or C++) or procedural programming languages (e.g., C or assembly language). In general, the term "programming," as used herein, refers to logic embodied in hardware or software instructions, such as firmware or applications, which can be written in a programming language, such as Java™, C, C++, C #, for example. A software application can be compiled into executable programs or written in interpreted programming languages, such as Perl, Visual Basic script, HTML, or JavaScript. Software applications may be callable from other applications. Generally, programming applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for self-healing and DBSCAN. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method comprising:
sending from a gateway, via a local wireless communication network or a secondary network, a health status request message to each commissioned luminaire in an indoor space requesting a health status response message;
in response to sending the health status request message to each commissioned luminaire:
receiving, via the local wireless communication network or the secondary network, from operational commissioned luminaires the health status response message indicating the commissioned luminaire identifier;
failing to receive from non-operational commissioned luminaires the health status response message indicating the commissioned luminaire identifier; and
storing the commissioned luminaire identifier of each of the non-operational commissioned luminaires in a non-operational commissioned luminaire list;
receiving, via the local wireless communication network or the secondary network, a respective uncommissioned luminaire identifier from a plurality of uncommissioned luminaires;
storing the respective uncommissioned luminaire identifier of the uncommissioned luminaires in an uncommissioned luminaire list;
sending, via the local wireless communication network or the secondary network, a scan request message to each uncommissioned luminaire requesting a scan response message;
in response to sending the scan request message to each uncommissioned luminaire, receiving, via the local wireless communication network or the secondary network, from each of the uncommissioned luminaires the scan response message including:
  (i) the respective uncommissioned luminaire identifier,
  (ii) a neighboring commissioned luminaire list of commissioned luminaire identifiers of neighboring commissioned luminaires, and
  (iii) a respective signal strength indicator measurement of the uncommissioned luminaire to each of the neighboring commissioned luminaires.

2. The method of claim 1, further comprising:
for each of the uncommissioned luminaires in the uncommissioned luminaire list:
  calculating a respective distance between an uncommissioned luminaire to each of the neighboring commissioned luminaires based on the respective signal strength indicator measurement; and
  based on the calculated respective distance to each of the neighboring commissioned luminaires and the set of commissioned location coordinates of each of the neighboring commissioned luminaires, estimating a set of uncommissioned location coordinates of the uncommissioned luminaire.

3. The method of claim 2, further comprising:
determining a best fit assignment of the set of uncommissioned location coordinates of the uncommissioned luminaires in the uncommissioned luminaire list to the set of commissioned location coordinates of the non-operational commissioned luminaires in the non-operational luminaire list.

4. The method of claim 3, further comprising:
adjusting a luminaire node map for each of the non-operational commissioned luminaires based on the determined best fit assignment by replacing a respective commissioned luminaire identifier setting of a respective non-operational commissioned luminaire stored in association with the set of commissioned location coordinates with the respective uncommissioned luminaire identifier that best fit the commissioned location coordinates; and
determining a physical location of a mobile device of a user based on the adjusted luminaire node map.

5. The method of claim 3, further comprising:
before determining the best fit assignment, dividing the luminaire node map into a plurality of luminaire node map clusters by executing a density based spatial clustering algorithm based on:
  (i) each set of the uncommissioned location coordinates of the uncommissioned luminaires in the uncommissioned luminaire list, and
  (ii) a threshold distance that is a maximum distance for determining whether the set of uncommissioned location coordinates resides within a respective luminaire node map cluster or not.

6. The method of claim 5, wherein determining the best fit assignment of the set of uncommissioned location coordinates of the uncommissioned luminaires in the uncommissioned luminaire list is executed on each respective luminaire node map cluster utilizing only the uncommissioned luminaires residing within the respective luminaire node map cluster.

7. The method of claim 3, wherein determining the best fit assignment of the set of uncommissioned location coordinates of the uncommissioned luminaires in the uncommissioned luminaire list further includes reassigning the operational commissioned luminaires in the luminaire node map that were previously incorrectly assigned to the set of commissioned location coordinates.

8. The method of claim 1, wherein the local wireless communication network is a mesh network and the method further comprises:
in response to receiving the scan request message at each uncommissioned luminaire:
  sending a mesh command over the mesh network, requesting the neighboring commissioned luminaires transmit packets including a respective commissioned luminaire identifier and a timestamp; and
  based on the respective commissioned luminaire identifier and the timestamp of the transmitted packets, calculating the respective signal strength indicator measurement of the uncommissioned luminaire to each of the neighboring commissioned luminaires.

9. The method of claim 8, further comprising:
sending the scan response message through a transport layer of the mesh network back to the gateway, the scan response message including:
  (i) the respective uncommissioned luminaire identifier,
  (ii) the neighboring commissioned luminaire list of commissioned luminaire identifiers of neighboring commissioned luminaires, and
  (iii) the calculated respective signal strength indicator measurement of the uncommissioned luminaire to each of the neighboring commissioned luminaires.

10. A luminaire-based positioning system comprising:
a plurality of luminaires located in an indoor space, each respective one of the luminaires including:
  a light source;
  a driver circuit coupled to the light source to control light source operation;
  a luminaire local wireless network communication interface configured for wireless communication over a local wireless communication network;
  a luminaire memory;
  a luminaire processor coupled to the driver circuit, the luminaire local network communication interface, and the luminaire memory; and
a gateway including:
  a gateway network communication interface system including a gateway local wireless network communication interface configured for wireless communication over the local wireless communication network;

a gateway memory including a luminaire node map of commissioned luminaires in the indoor space, the luminaire node map having:
  multiple commissioned luminaire identifier settings, including a respective commissioned luminaire identifier setting of each commissioned luminaire in the indoor space; and
  multiple sets of commissioned location coordinates, each set of commissioned location coordinates stored in association with the respective commissioned luminaire identifier setting;
a gateway processor coupled to the gateway network communication interface system and the gateway memory;
gateway self-healing programming in the gateway memory, wherein execution of the gateway self-healing programming by the gateway processor configures the gateway to implement functions, including functions to:
  send, via the gateway local wireless network communication interface, a health status request message to each commissioned luminaire requesting a health status response message;
  in response to sending the health status request message to each commissioned luminaire:
    receive from operational commissioned luminaires the health status response message indicating a commissioned luminaire identifier;
    fail to receive from non-operational commissioned luminaires the health status response message indicating the commissioned luminaire identifier; and
    store the commissioned luminaire identifier of each of the non-operational commissioned luminaires in a non-operational commissioned luminaire list;
  receive, via the gateway local wireless network communication interface, a respective uncommissioned luminaire identifier from a plurality of uncommissioned luminaires in the indoor space; and
  store the respective uncommissioned luminaire identifier of the uncommissioned luminaires in an uncommissioned luminaire list;
  send, via the gateway local wireless network communication interface, a scan request message to each uncommissioned luminaire requesting a scan response message;
  in response to sending the scan request message to each uncommissioned luminaire, receive from each of the uncommissioned luminaires the scan response message including:
    (i) the respective uncommissioned luminaire identifier,
    (ii) a neighboring commissioned luminaire list of commissioned luminaire identifiers of neighboring commissioned luminaires, and
    (iii) a respective received signal strength indicator (RSSI) measurement of the uncommissioned luminaire to each of the neighboring commissioned luminaires.

11. The luminaire-based positioning system of claim 10, further comprising:
a cloud computing device including:
  a cloud computing device wide area network (WAN) communication interface configured for communication over a WAN;
  a cloud computing device memory;
  a cloud computing device processor coupled to the cloud computing device WAN communication interface and the cloud computing device memory; and
  cloud computing device self-healing programming in the cloud computing device memory;
wherein:
  the gateway network communication interface system further includes a gateway WAN communication interface for communication over the WAN;
  execution of the gateway self-healing programming by the gateway processor configures the gateway to implement functions, including functions to:
    in response to receiving from each of the uncommissioned luminaires the scan response message, send, via the gateway WAN communication interface, to the cloud computing device:
      (a) (i) the respective uncommissioned luminaire identifier, (ii) the neighboring commissioned luminaire list, and (iii) the respective RSSI measurement;
      (b) the luminaire node map;
      (c) the non-operational commissioned luminaire list; and
      (d) the uncommissioned luminaire list.

12. The luminaire-based positioning system of claim 11, wherein execution of the cloud computing device self-healing programming by the cloud computing device processor configures the cloud computing device to implement functions, including functions to:
for each of the uncommissioned luminaires in the uncommissioned luminaire list:
  calculate a respective distance between an uncommissioned luminaire to each of the neighboring commissioned luminaires based on the respective RSSI measurement; and
  based on the calculated respective distance to each of the neighboring commissioned luminaires and the set of commissioned location coordinates of each of the neighboring commissioned luminaires, estimate a set of uncommissioned location coordinates of the uncommissioned luminaire;
determine a best fit assignment of the set of uncommissioned location coordinates of the uncommissioned luminaires in the uncommissioned luminaire list to the set of commissioned location coordinates of the non-operational commissioned luminaires in the non-operational luminaire list;
adjust the luminaire node map for each of the non-operational commissioned luminaires based on the determined best fit assignment by replacing the respective commissioned luminaire identifier setting of a respective non-operational commissioned luminaire stored in association with the set of commissioned location coordinates with the respective uncommissioned luminaire identifier that best fit the commissioned location coordinates; and
send, via the cloud computing device WAN communication interface, to the gateway the adjusted luminaire node map.

13. The luminaire-based positioning system of claim 12, wherein execution of the cloud computing device self-healing programming by the cloud computing device processor configures the cloud computing device to implement functions, including functions to:
before determining the best fit assignment, divide the luminaire node map of the indoor space into a plurality of luminaire node map clusters by executing a density based spatial clustering algorithm based on:
(i) each set of the uncommissioned location coordinates of the uncommissioned luminaires in the uncommissioned luminaire list, and
(ii) a threshold distance that is a maximum distance for determining whether the set of uncommissioned location coordinates resides within a respective luminaire node map cluster or not.

14. The luminaire-based positioning system of claim 13, wherein determining the best fit assignment of the set of uncommissioned location coordinates of the uncommissioned luminaires in the uncommissioned luminaire list is executed on each respective luminaire node map cluster utilizing only the uncommissioned luminaires residing within the respective luminaire node map cluster.

15. The luminaire-based positioning system of claim 12, wherein determining the best fit assignment of the set of uncommissioned location coordinates of the uncommissioned luminaires in the uncommissioned luminaire list further includes reassigning the operational commissioned luminaires in the luminaire node map that were previously incorrectly assigned to the set of commissioned location coordinates.

16. The luminaire-based positioning system of claim 12, wherein execution of the gateway self-healing programming by the gateway processor configures the gateway to implement functions, including functions to:
receive, via the gateway WAN communication interface, from the cloud computing device the adjusted luminaire node map;
replace the luminaire node map with the adjusted luminaire node map; and
determine a physical location of a mobile device of a user in the indoor space based on the adjusted luminaire node map.

17. The luminaire-based position system of claim 10, wherein execution of the gateway self-healing programming by the gateway processor configures the gateway to implement functions, including functions to:
in response to sending the scan request message to each uncommissioned luminaire:
calculate a respective distance between an uncommissioned luminaire to each of the neighboring commissioned luminaires based on the respective RSSI measurement; and
based on the calculated respective distance to each of the neighboring commissioned luminaires and the set of commissioned location coordinates of each of the neighboring commissioned luminaires, estimate a set of uncommissioned location coordinates of the uncommissioned luminaire;
determine a best fit assignment of the uncommissioned location coordinates of the uncommissioned luminaires in the uncommissioned luminaire list to the set of commissioned location coordinates of the non-operational commissioned luminaires in the non-operational luminaire list; and
adjust the luminaire node map for each of the non-operational commissioned luminaires based on the determined best fit assignment by replacing the respective commissioned luminaire identifier setting of a respective non-operational commissioned luminaire stored in association with the set of commissioned location coordinates with the respective uncommissioned luminaire identifier that best fit the commissioned location coordinates.

18. The luminaire-based positioning system of claim 10, wherein:
the local wireless communication network is a mesh network; and
the luminaire further includes luminaire self-healing programming in the luminaire memory, wherein execution of the luminaire self-healing programming by the luminaire processor configures each uncommissioned luminaire to implement functions, including functions to:
in response to receiving the scan request message, send, via the luminaire local network communication interface, a mesh command over the mesh network requesting the neighboring commissioned luminaires transmit packets including a respective commissioned luminaire identifier and a timestamp; and
based on the respective commissioned luminaire identifier and the timestamp of the transmitted packets, calculate the respective RSSI measurement of the uncommissioned luminaire to each of the neighboring commissioned luminaires.

19. The luminaire-based positioning system of claim 18, wherein execution of the luminaire self-healing programming by the luminaire processor configures each uncommissioned luminaire to implement functions, including functions to:
send, via the luminaire local wireless network communication interface, the scan response message through a transport layer of the mesh network back to the gateway, the scan response message including:
(i) the respective uncommissioned luminaire identifier,
(ii) the neighboring commissioned luminaire list of commissioned luminaire identifiers of the neighboring commissioned luminaires, and
(iii) the calculated respective RSSI measurement of the uncommissioned luminaire to each of the neighboring commissioned luminaires.

20. The luminaire-based positioning system of claim 19, wherein:
the scan response message is divided into a plurality of advertisement packets, each advertisement packet including the respective uncommissioned luminaire identifier, the commissioned luminaire identifier of one of the neighboring commissioned luminaires, and the calculated respective RSSI measurement; and
execution of the gateway self-healing programming by the gateway processor configures the gateway to implement functions, including functions to:
aggregate the plurality of advertisement packets into the scan response message sent from each uncommissioned luminaire based on the respective uncommissioned luminaire identifier.

* * * * *